(12) United States Patent
Kilibarda et al.

(10) Patent No.: US 10,640,297 B2
(45) Date of Patent: May 5, 2020

(54) TRANSPORT SYSTEM AND METHODS

(71) Applicant: Comau LLC, Southfield, MI (US)

(72) Inventors: Velibor Kilibarda, Southfield, MI (US);
Michael R. Dugas, Brighton, MI (US);
Lei Zhou, Bloomfield Hills, MI (US);
Freddie Tappo, Sterling Heights, MI (US); Tracy Taylor, Windsor (CA);
Radomir Senic, Windsor (CA)

(73) Assignee: Comau LLC, Southfield, MI (US)

( * ) Notice: Subject to any disclaimer, the term of this patent is extended or adjusted under 35 U.S.C. 154(b) by 0 days.

(21) Appl. No.: 16/182,275

(22) Filed: Nov. 6, 2018

(65) Prior Publication Data

US 2019/0135549 A1 May 9, 2019

Related U.S. Application Data

(60) Provisional application No. 62/582,379, filed on Nov. 7, 2017.

(51) Int. Cl.
*B65G 35/06* (2006.01)
*B62D 65/18* (2006.01)
*B66F 9/065* (2006.01)

(52) U.S. Cl.
CPC .......... *B65G 35/06* (2013.01); *B62D 65/18* (2013.01); *B66F 9/065* (2013.01); *B65G 2201/0267* (2013.01); *B65G 2201/0294* (2013.01)

(58) Field of Classification Search
CPC .............. B65G 47/22; B65G 35/06; B65G 2201/0294; B65G 2201/0267; B62D 65/18

USPC ........................................................ 198/345.3
See application file for complete search history.

(56) References Cited

U.S. PATENT DOCUMENTS

| | | |
|---|---|---|
| 3,854,889 A | 12/1974 | Lemelson |
| 4,032,018 A | 6/1977 | Wallis |
| 4,232,370 A | 11/1980 | Tapley |
| 4,328,422 A | 5/1982 | Loomer |

(Continued)

FOREIGN PATENT DOCUMENTS

| | | |
|---|---|---|
| DE | 19806963 A1 | 10/1998 |
| DE | 202013004209 U1 | 7/2013 |

(Continued)

OTHER PUBLICATIONS

Ts 1 Transfer System; Bosch Rexroth AG, Sep. 25, 2018.

(Continued)

*Primary Examiner* — James R Bidwell
(74) *Attorney, Agent, or Firm* — Young Basile Hanlon & MacFarlane, P.C.

(57) ABSTRACT

A transport system and method useful for autonomously or semi-autonomously transporting and positioning materials or components in an industrial facility. In one example in use for passenger vehicle body assembly, a transport device includes a lift device and first and second build devices for alternately supporting a workpiece. The transport device includes a clearance opening for passage by the second build device along the path of travel. The transport device positions the first build device and workpiece over the second build device and deposits the workpiece on the lower second build device for processing. When the process is complete, the first build device re-engages the workpiece for movement to another workstation.

25 Claims, 17 Drawing Sheets

(56) References Cited

U.S. PATENT DOCUMENTS

| | | | |
|---|---|---|---|
| 4,369,563 A | 1/1983 | Williamson |
| 4,404,505 A | 9/1983 | Swanson et al. |
| 4,442,335 A | 4/1984 | Rossi |
| 4,530,056 A | 7/1985 | MacKinnon et al. |
| 4,600,136 A | 7/1986 | Sciaky et al. |
| 4,657,463 A | 4/1987 | Pipes |
| 4,659,895 A | 4/1987 | Di Rosa |
| 4,667,866 A | 5/1987 | Tobita et al. |
| 4,679,297 A | 7/1987 | Hansen, Jr. et al. |
| 4,734,979 A | 4/1988 | Sakamoto et al. |
| 4,736,515 A | 4/1988 | Catena |
| 4,738,387 A | 4/1988 | Jaufmann et al. |
| 4,779,787 A | 10/1988 | Naruse et al. |
| 4,795,075 A | 1/1989 | Pigott et al. |
| 4,800,249 A | 1/1989 | Di Rosa |
| 4,815,190 A | 3/1989 | Haba, Jr. et al. |
| 4,944,357 A | 7/1990 | Wible et al. |
| 5,011,068 A | 4/1991 | Stoutenburg et al. |
| 5,091,855 A | 2/1992 | Umehara et al. |
| 5,239,739 A | 8/1993 | Akeel et al. |
| 5,272,805 A | 12/1993 | Akeel et al. |
| 5,301,411 A | 4/1994 | Fujiwara et al. |
| 5,319,840 A | 6/1994 | Yamamoto et al. |
| 5,347,700 A | 9/1994 | Tominaga et al. |
| 5,397,047 A | 3/1995 | Zampini |
| 5,400,944 A | 3/1995 | Zimmer et al. |
| 5,427,300 A | 6/1995 | Quagline |
| 5,560,535 A | 10/1996 | Miller et al. |
| 5,577,593 A | 11/1996 | Hooper |
| 5,577,595 A | 11/1996 | Pollock et al. |
| 5,902,496 A | 5/1999 | Alborante |
| 5,940,961 A | 8/1999 | Parete |
| 5,943,768 A | 8/1999 | Ray |
| 6,059,169 A | 5/2000 | Nihei et al. |
| 6,065,200 A | 5/2000 | Negre |
| 6,098,268 A | 8/2000 | Negre et al. |
| 6,138,889 A | 10/2000 | Campani et al. |
| 6,170,732 B1 | 1/2001 | Vogt et al. |
| 6,193,142 B1 | 2/2001 | Segawa et al. |
| 6,250,533 B1 | 6/2001 | Otterbein et al. |
| 6,324,880 B1 | 12/2001 | Nakamura |
| 6,336,582 B1 | 1/2002 | Kato et al. |
| 6,457,231 B1 | 10/2002 | Carter et al. |
| 6,467,675 B1 | 10/2002 | Ozaku et al. |
| 6,516,234 B2 | 2/2003 | Kamiguchi et al. |
| 6,564,440 B2 | 5/2003 | Oldford et al. |
| 6,627,016 B2 | 9/2003 | Abare et al. |
| 6,634,097 B1 | 10/2003 | Ikeda |
| 6,744,436 B1 | 6/2004 | Chirieleison, Jr. et al. |
| 6,799,673 B2 | 10/2004 | Kilabarda |
| 6,801,821 B2 | 10/2004 | Madden et al. |
| 6,948,227 B2 | 9/2005 | Kilibarda et al. |
| 6,966,427 B2 | 11/2005 | Kilibarda |
| 7,076,865 B2 | 7/2006 | Morbitzer et al. |
| 7,331,439 B2 | 2/2008 | Degain et al. |
| 7,546,942 B2 | 6/2009 | Monti et al. |
| 7,946,030 B2 | 5/2011 | Tanaka et al. |
| 8,201,723 B2 | 6/2012 | Kilibarda |
| 8,229,586 B2 | 7/2012 | Wallace et al. |
| 8,250,743 B2 | 8/2012 | Habisreitinger |
| 8,308,048 B2 | 11/2012 | Kilibarda |
| 8,527,153 B2 | 9/2013 | Doan |
| 8,713,780 B2 | 5/2014 | Kilibarda |
| 8,869,370 B2 | 10/2014 | Kilibarda |
| 9,014,836 B2 | 4/2015 | Stone et al. |
| 9,132,873 B1 | 9/2015 | Laurence et al. |
| 9,513,625 B2 | 12/2016 | Kilibarda |
| 9,581,983 B2 | 2/2017 | Kilibarda et al. |
| 9,815,511 B2 | 11/2017 | Kilibarda et al. |
| 2003/0037432 A1 | 2/2003 | McNamara |
| 2003/0057256 A1 | 3/2003 | Nakamura et al. |
| 2003/0115746 A1 | 6/2003 | Saito et al. |
| 2003/0188952 A1 | 10/2003 | Oldford et al. |
| 2003/0189085 A1 | 10/2003 | Kilibarda et al. |
| 2004/0020974 A1 | 2/2004 | Becker et al. |
| 2004/0216983 A1 | 11/2004 | Oldford et al. |
| 2004/0221438 A1 | 11/2004 | Savoy et al. |
| 2005/0008469 A1 | 1/2005 | Jung |
| 2005/0035175 A1 | 2/2005 | Nakamura et al. |
| 2005/0120536 A1 | 6/2005 | Kilibarda et al. |
| 2005/0189399 A1 | 9/2005 | Kilibarda |
| 2005/0230374 A1 | 10/2005 | Rapp et al. |
| 2005/0236461 A1 | 10/2005 | Kilibarda et al. |
| 2005/0269382 A1 | 12/2005 | Caputo et al. |
| 2006/0157533 A1 | 7/2006 | Onoue et al. |
| 2007/0164009 A1 | 7/2007 | Hesse |
| 2008/0061110 A1 | 3/2008 | Monti et al. |
| 2008/0084013 A1 | 4/2008 | Kilibarda |
| 2008/0105733 A1 | 5/2008 | Monti et al. |
| 2008/0116247 A1 | 5/2008 | Kilibarda |
| 2008/0131255 A1 | 6/2008 | Hessler et al. |
| 2008/0295335 A1 | 12/2008 | Kilibarda et al. |
| 2009/0078741 A1 | 3/2009 | Sata et al. |
| 2009/0285666 A1 | 11/2009 | Kilibarda |
| 2010/0247275 A1* | 9/2010 | Karlen ................. B65D 88/022 414/286 |
| 2010/0301099 A1 | 12/2010 | Sata et al. |
| 2011/0265301 A1 | 11/2011 | Kilibarda |
| 2012/0216384 A1 | 8/2012 | Immekus |
| 2015/0001287 A1 | 1/2015 | Kilibarda |
| 2017/0320669 A1 | 11/2017 | Kilibarda et al. |
| 2017/0344009 A1 | 11/2017 | Wernersbach |
| 2018/0093728 A1 | 4/2018 | Mayr |
| 2018/0319286 A1* | 11/2018 | Greyson ................. B25J 19/005 |

FOREIGN PATENT DOCUMENTS

| | | | |
|---|---|---|---|
| DE | 102015000968 A1 | 4/2016 |
| EP | 0261297 A1 | 3/1988 |
| EP | 0446518 A1 | 9/1991 |
| EP | 1403176 A2 | 3/2004 |
| FR | 3049481 A1 | 10/2017 |
| GB | 2231687 A | 11/1990 |
| GB | 2250723 A | 6/1992 |
| JP | S6413515 U | 1/1989 |
| JP | H06345397 A | 12/1994 |
| WO | 8603153 A1 | 6/1986 |
| WO | 2006109246 A1 | 10/2006 |
| WO | 2009131293 A1 | 10/2009 |
| WO | 2011053681 A1 | 5/2011 |

OTHER PUBLICATIONS

Flexible Transport System: Assembly Technology With High Degree of Freedom; Harro Hofliger; Sep. 25, 2018.

FMC; Automated Fork lifts and Material Handling Lifts—Forked Automated Guided Vehicles; http://www.fmcsgvs.com/content/products/forked.sub.—vehicles.htm;p. 1.

FMC; SGV (Self Guided Vehicles)—Automated Guided Vehicle Systems; http://www.fmcsgvs.com/content/products/sgv_htm, p. 1.

FMC; Automated Material Handling Systems & Equipment for Material Movement: AGV Applications; http://www.fmcsgvs.com/content/sales/applications.htm; pp. 1-2.

FmMC; Layout Wizard AGV Configuration Software; http://fmcsgvs.com/content/products/wizard.htm; p. 1.

FMC; AGV System Controls; http://www.fmcsgvs.com/content/products/system.htm; p. 1.

FMC; Laser Navigation Controls; http://www.fmcsgvs.com/content/products/nav.htm; pp. 1-2.

European Search Report dated Apr. 19, 2011 from the corresponding European Patent Application No. 11152656.2-2302.

European Search Report dated Aug. 28, 2009 from the corresponding European Patent Application No. 09158794.9-2302.

* cited by examiner

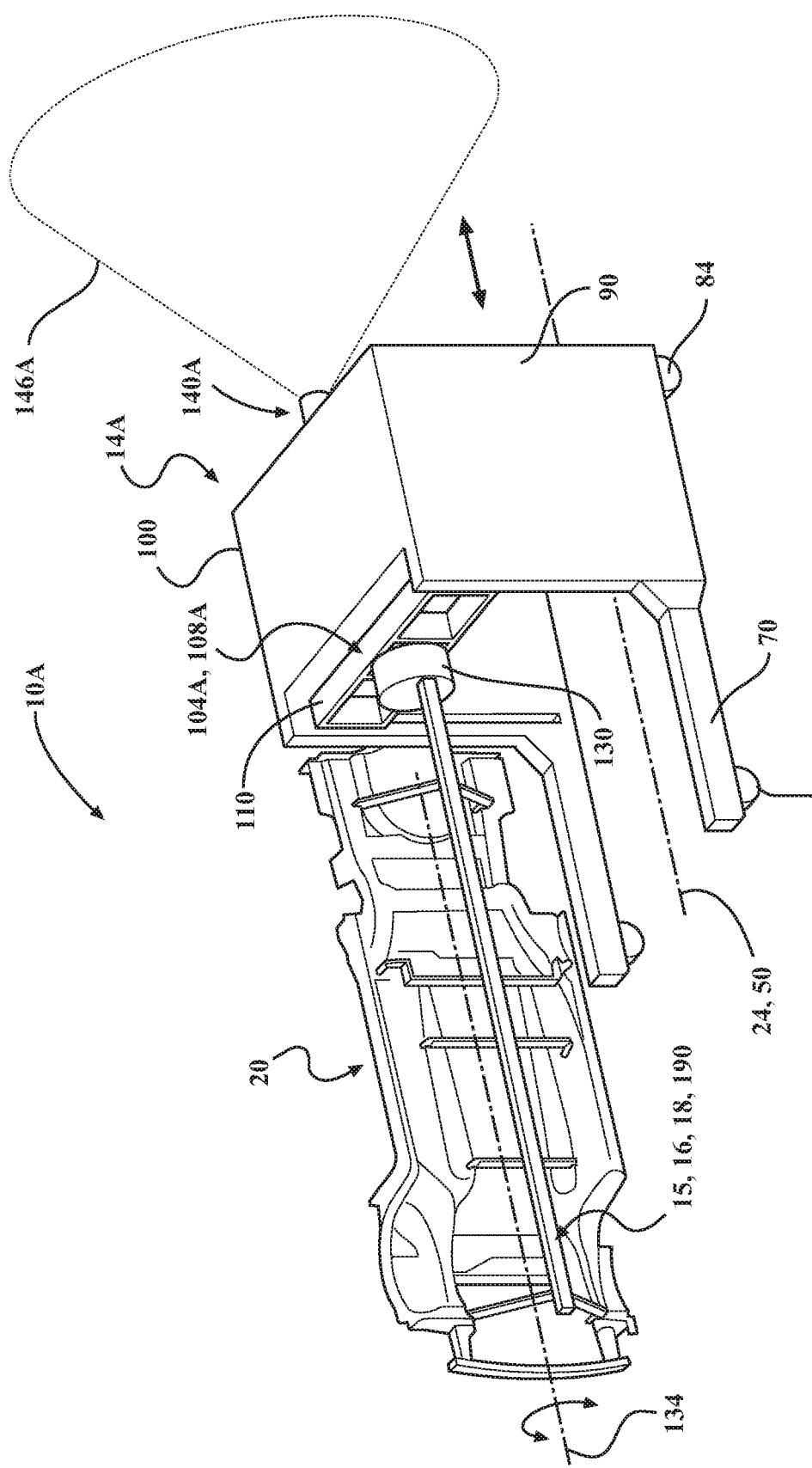

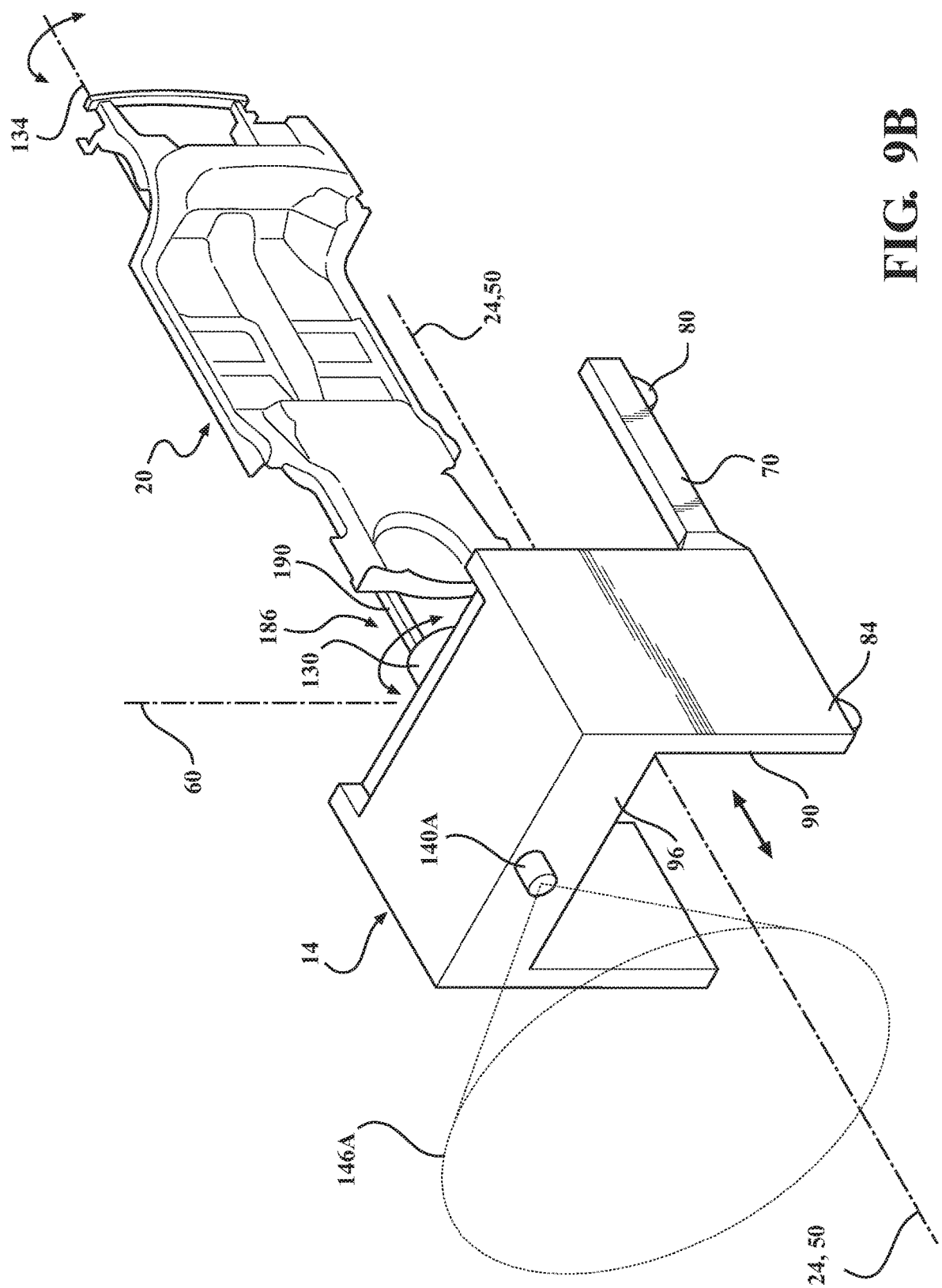

TRANSPORT SYSTEM AND METHODS

CROSS-REFERENCE TO RELATED APPLICATIONS

This application claims priority benefit to U.S. Provisional Patent Application Ser. No. 62/582,379 filed Nov. 7, 2017 the entire contents of which is incorporated herein by reference.

TECHNICAL FIELD

This disclosure relates to transport systems for exemplary use in moving or transporting components, holding fixtures, partially assembled products and other items or equipment in an industrial or logistics complex or assembly line.

BACKGROUND

Conventional assembly plants and assembly lines employed large conveyor systems to move components, partially assembled structures and assembly tooling/fixtures along an assembly line through sequential stations. These floor-mounted conveyors included powered rollers or belts which engaged and moved large, heavy pallets along an assembly path of travel. One example of a powered pallet transfer system is the VERSAPALLET® powered transfer system disclosed in U.S. Pat. No. 6,966,427 owned by the present assignee and incorporated herein by reference. These powered pallet systems have evolved to precisely and accurately position the pallets and supported components in modern assembly and manufacturing workstations and processes. One example of a powered pallet transfer system is the VERSACODER® powered transfer system disclosed in U.S. Pat. No. 7,108,189 owned by the present assignee and incorporated herein by reference. Examples of overhead conveyor systems, including devices for lowering components and subassemblies supported by the overhead conveyor downward into fixtures for processing, are described in one or more of U.S. Pat. Nos. 6,719,122; 6,557,690; 6,564,440; and 6,799,673 all of which are incorporated herein by reference.

These conventional assembly or transfer devices included large, heavy infrastructure, for example floor-mounted rail structures which supported the pallets carrying the partially assembled components. In addition to the large, heavy infrastructure, a disadvantage of floor-mounted or overhead conveyor systems is that the pallets or component supporting/holding fixtures are confined to the fixed path of travel of the conveyor, making it difficult to remove or insert a pallet or fixture.

More modern assembly plants increasingly use automated guided vehicles (AGV's) or automated guided carts (AGC's) to move components and equipment around assembly facilities. AGV's generally include sophisticated guidance devices, for example laser scanners, proximity sensors, GPS and the devices to guide the AGV along a predetermined course. AGV's are generally more accurate in following a preprogrammed path or course and stopping at a predetermined location, for example +/−ten (10) millimeters (mm), from a target position. As a result of the AGV's increased maneuverability and accuracy, AGV's are expensive. AGC's and other devices are less accurate in their maneuverability and accuracy, but are considerably less expensive than AGV's.

Even with the increased accuracy of AGV's (+/−10 mm), modern AGV's are still not accurate enough to use for positioning components and partially-assembled structures for modern precision assembly workstations or assembly cell operations. In addition, the use of AGV's were largely limited to moving components and equipment from one position to a predetermined destination. At the destination, a transfer of the partially-assembled component from the AGV to a fixture or other device directly used for the assembly process was needed. In such instances, a manipulator, for example by a robot, was required which requires additional infrastructure, floor space, time used to transfer, and increases costs to produce the final saleable product.

It would be advantageous to employ the use of AGVs, or AGV-like autonomous devices, to directly position components at workstations without use of large infrastructure-intensive devices like conventional pallet conveyors. It would be further advantageous to accurately and precisely locate components at workstations without auxiliary, or dedicated, equipment and methods such as powered manipulator devices such as programmable robots and/or supplemental positioning devices.

SUMMARY

Disclosed herein is a transport system and methods. In one example, a transport device is used to autonomously or semi-autonomously transfer a workpiece or components along a path of travel in logistical operations and material supply management. In one example, the transport device transfers a progressively-assembled workpiece through several workstations positioned along, or in communication with, the path of travel. In one example, the transport device is connected to a carrier in the form of a first build device which is used to support a workpiece which is progressively assembled in the workstations.

In one example of the transport device, the transport device includes a clearance opening which is sized and oriented to allow the transport device to pass over a second build device that is positioned along the path of travel in the workstation. On entrance of the transport device into the workstation, the clearance opening allows the second build device to pass through the opening allowing the first build device to be positioned over the second build device.

In one example, the transport device includes a manipulator device which moves relative to transport device frame to move or reorient the carrier or workpiece relative to the frame or workstation. In one example, the manipulator device is a lift device which lowers the first build device and workpiece such that the workpiece is disengaged from the first build device and deposited on the second build device which accurately and precisely positions the workpiece for assembly or manufacturing operations at the workstation. On completion of the workstation operations, the lift device rises vertically to re-engage the first build device with the workpiece thereby simultaneously disengaging the workpiece from the second build device. The transport device thereafter autonomously moves along the path of travel to the next workstation or destination.

In one example, the transport device enters the workstation and the manipulator device simply rotates or reorients the workpiece rather than lowers and deposits the workpiece on a second build device.

In another example, the transport device wirelessly receives data signals which include instructions or commands which determine, for example, the transport device's path of travel. The instructions may be received from a central command center in an industrial facility or through a local command node, for example, in one area of an assembly facility.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9A is perspective view of an alternate example of the transport system of FIG. 1 showing an alternate manipulation of the workpiece.

FIG. 9B is an alternate perspective view of FIG. 9A.

DETAILED DESCRIPTION

Referring to FIGS. 1-14 examples of a transport system 10 and methods 400 for exemplary uses in transporting components along a path of travel. In one example or application, the transport system is useful in transporting a component in the form of a progressively assembled workpiece to a workstation and then positioning the workpiece at a workstation for precision work on the workpiece. In one example, the system 10 is used to transport and position automobile body components and subassemblies that are sequentially built through sequentially-positioned workstations along an assembly line. It is understood that system 10 may be used in other applications, for example, in manufacturing processes, or other assembly processes, and other applications where products or articles are transferred through multi-station process lines.

In the below examples, it is understood that the transferred component or workpiece may include one or more of raw materials, hardware, consumable assembly supplies or materials, fasteners, partially or wholly completed parts or subassemblies, assembly or manufacturing equipment, or other parts, products or materials known by those skilled in the art. The components may be transported from place-to-place in an industrial facility, for example, moving components from, for example, a storage area in one portion of an industrial facility to an active production assembly line in another portion of the industrial facility. The present invention may have other uses and applications as known by those skilled in the art.

Figure 1:
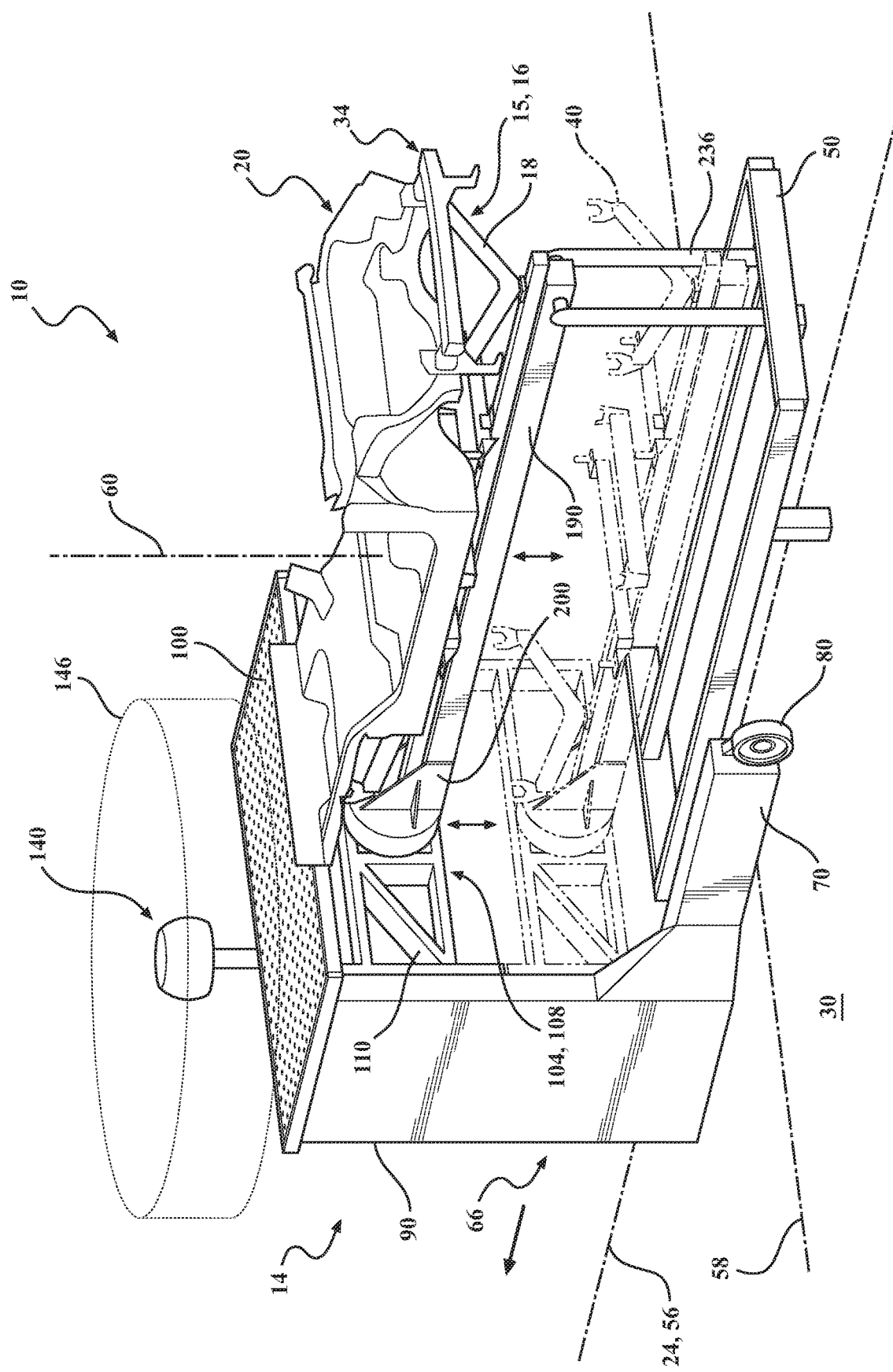
FIG. 1 is a perspective view of one example of a transport system in use with an exemplary build device in the form of a first fixture in a first and a second position.
Figure 2:
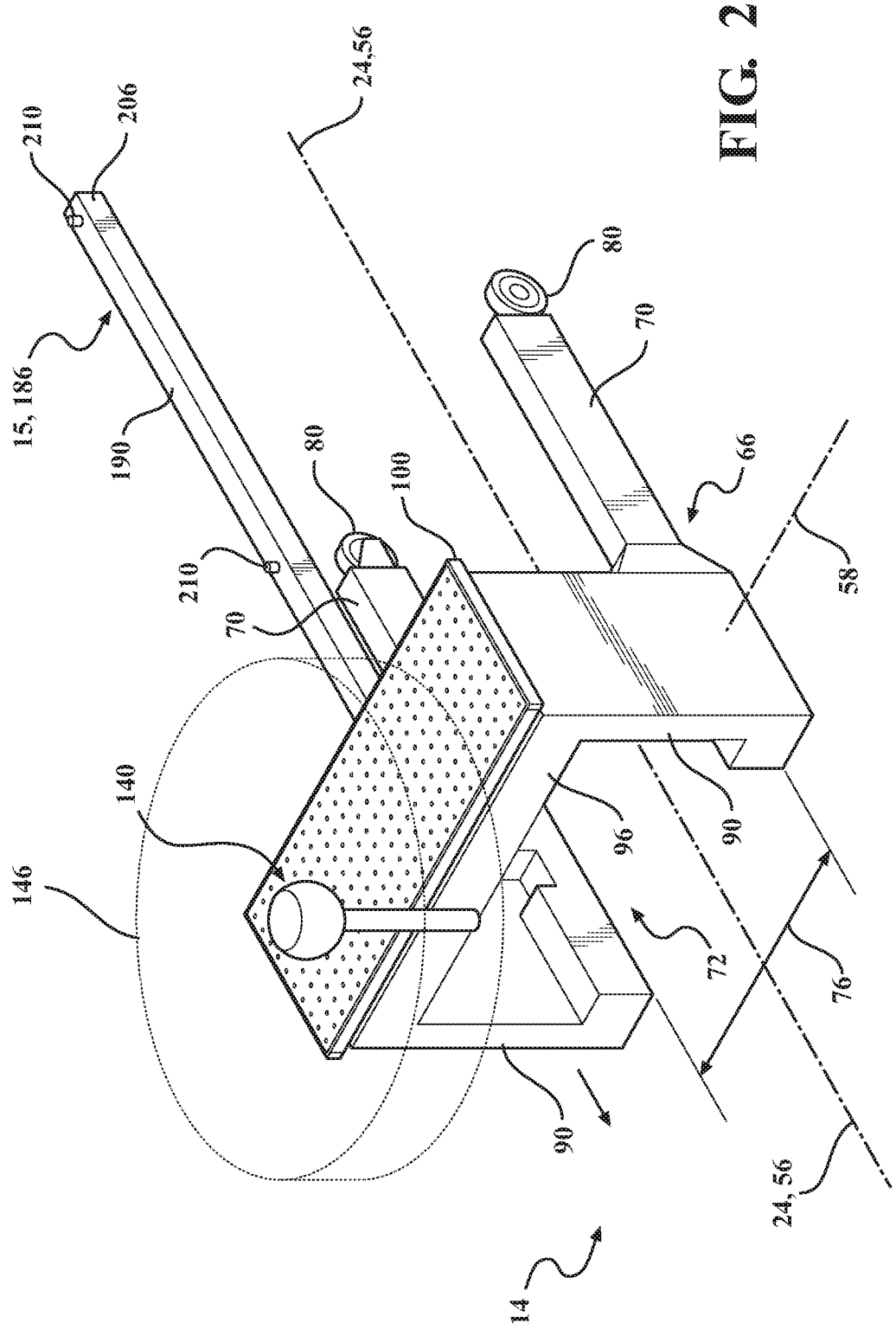
FIG. 2 is an alternate perspective view of an example of a transfer device useful in the system in FIG. 1.
Figure 3:
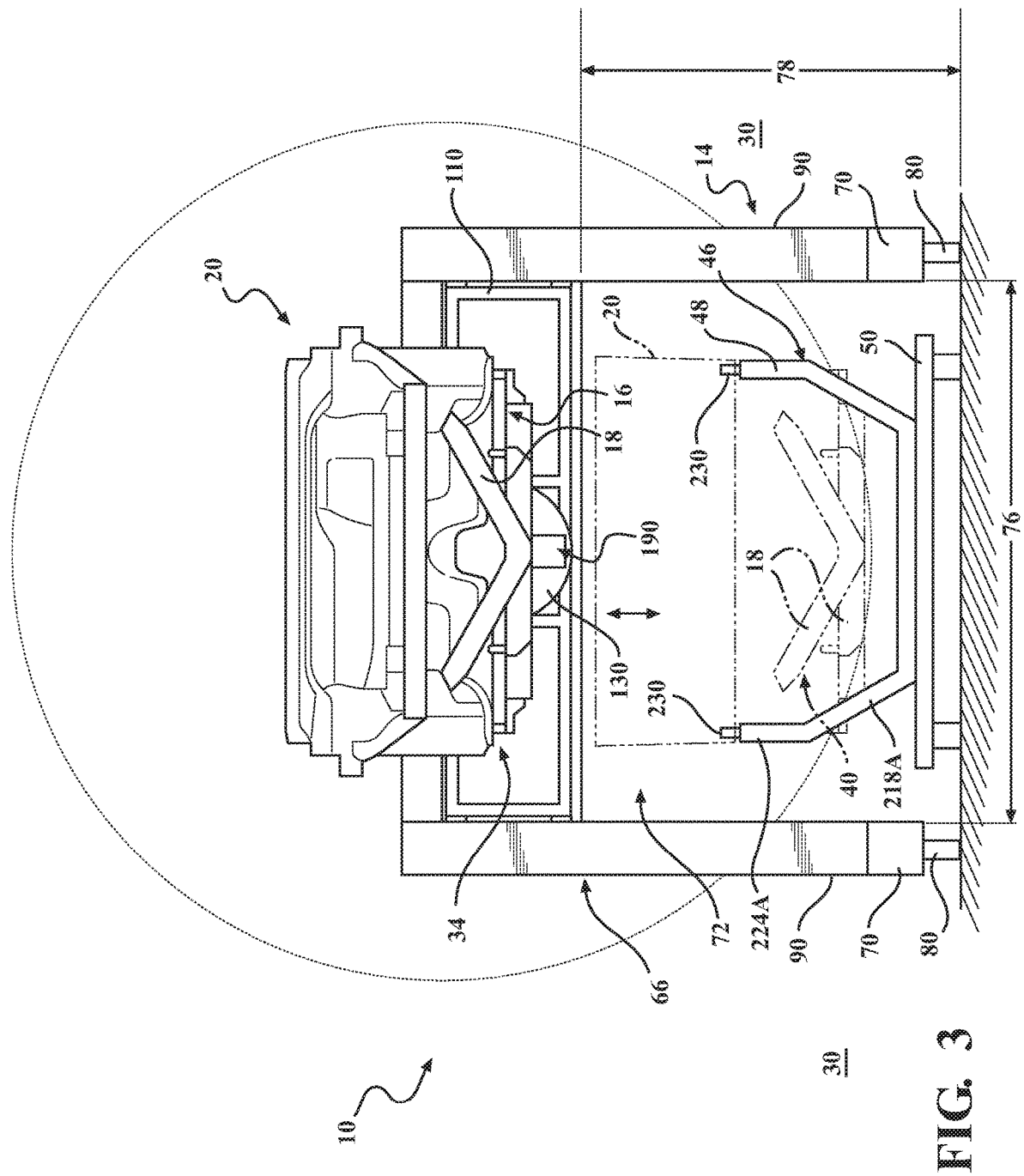
FIG. 3 is a right end view of an example of the system of FIG. 1, but alternately including an exemplary second build device in the form of a second fixture.

Referring to FIGS. 1-3, an example of system 10 includes a transport device 14 shown engaged with a carrier 15. In one example carrier 15 is a first build device 16 in the form of a first fixture 18. In the example, first fixture 18 is supporting a workpiece or article 20, for example the sheet metal underbody frame for a passenger vehicle. It is understood that other workpieces or articles 20 may be engaged, supported and transferred by transport device 14 and system 10. For example, workpieces or articles 20 may include single components, multiple separate components, partially completed subassemblies, or completed products. The workpieces 20 may be other objects and/take other forms as known by those skilled in the art.

In one example, system 10 and transport device 14 includes a predetermined path of travel 24. As further described below, exemplary transfer device 14 is an autonomous, or semi-autonomous, device and/or a form of an automated guided vehicle (AGV) wherein, in one example, preprogrammed instructions as to a route or path of travel 24 are stored and executed by a control system onboard the transfer device 14. In an alternate example discussed below, transport device may not include a predetermined or pre-stored in memory path to travel. Alternately, transport device may wirelessly receive data signals or instructions "on-the-fly" which direct the direction of movement, rate of travel, or other operations of device 14.

As further described below, in the illustrated example, when the transport device 14 is positioned in a workstation 30, transport device 14 is operable to reciprocally move the first build device 16 and workpiece 20 from a first position 34 well above the floor to a lower second position 40 (shown schematically in FIG. 1 as a lower zone or volume of space) along a Z axis 60 or coordinate direction. As best seen in FIG. 3, in the illustrated example, the second position 40 provides for the automatic placement or deposit of the workpiece 20 on a second build device 46, shown in the exemplary form of a second fixture 48 (shown schematically as rectangle volumes in FIG. 1 and an exemplary holding fixture 48 in FIG. 3). The exemplary second fixture 48 precisely and accurately positions the workpiece 20 in the workstation 30 in the X axis or coordinate direction 24/56, the Y axis or coordinate direction 58, and the Z axis or coordinate direction 60 as generally shown for precision assembly or manufacturing operations on the workpiece 20. Second build device 46 is shown supported by an exemplary stationary platform 50 rigidly connected to the assembly plant floor. It is understood that first build device 16, second build device 46 and platform 50 can take any structures, forms, or orientations to suit the particular application of system 10 and industrial environment.

As best seen in FIGS. 2 and 3, exemplary transport device 14 includes a frame 66 having a pair of rails 70 and sidewalls 90 as generally shown. Transport device 14 further includes a cross-member 96 connected to the top portions of the side walls 90. The frame 66 and cross-member 96 define a clearance opening or through passage 72 through the frame 66 along the X axis 56 having a clearance opening width 76 and a clearance opening height 78.

Exemplary transport device 14 further includes a pair of casters 80 and drive wheels 84 (shown in FIGS. 4 and 5) allowing transport device 14 to roll along the path of travel 24. In one example, cross-member 96 is box-shaped having an internal cavity (not shown) having a top 100 to package and securely house the control system and/or possibly other materials described below. The exemplary rails 70, side walls 90, cross-member 96, and top 100 are preferably made from strong, rigid, load bearing materials such as steel or aluminum. Lighter materials, for example carbon fiber composite materials, may be used to suit the particular application and industrial environment. It is understood that frame 66, rails 70 and cross-member 96 may take other forms, shapes, configurations, sizes, and materials to suit the particular application and performance requirements as known by those skilled in the art.

Figure 4:
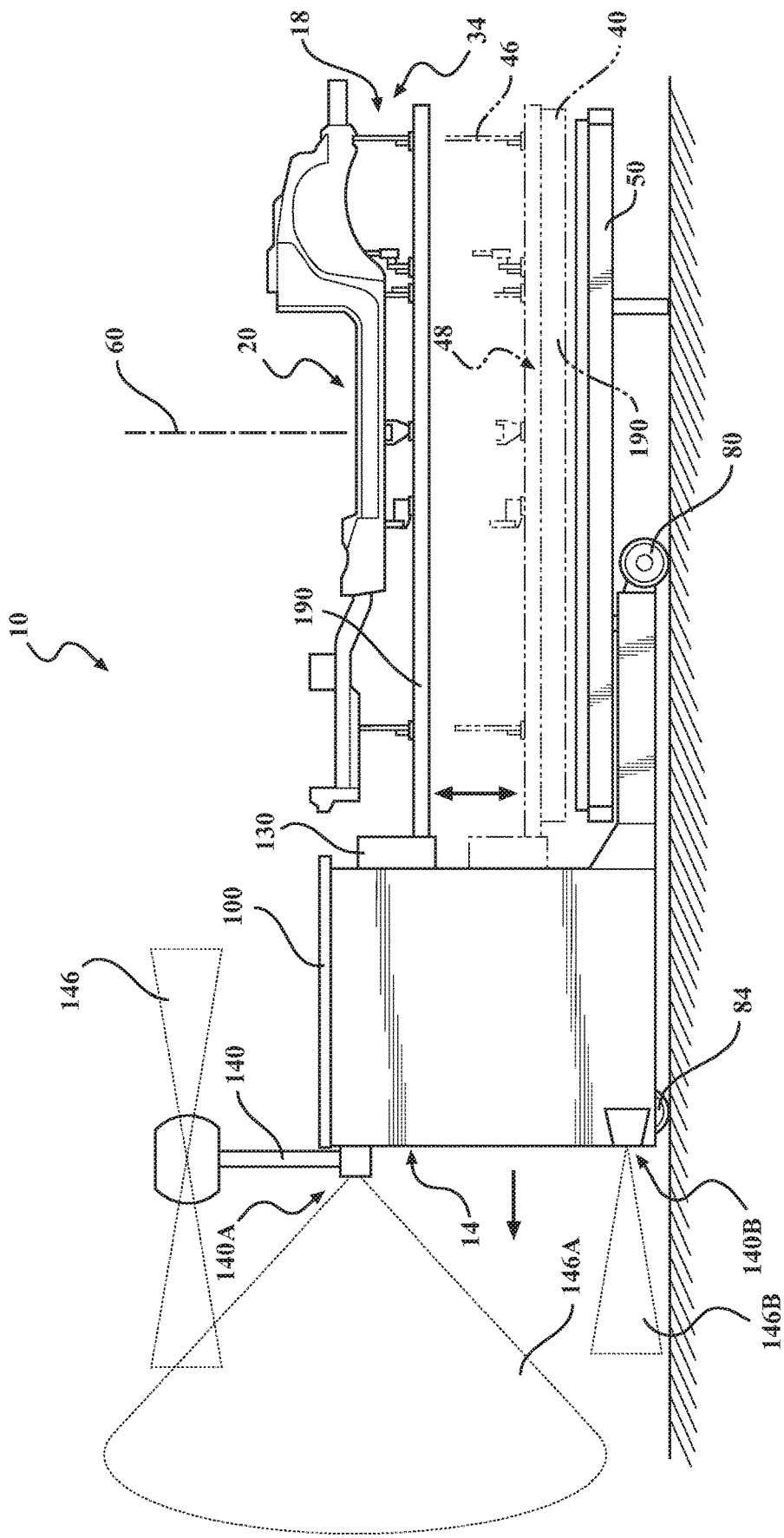
FIG. 4 is a left side view of the example transport system shown in FIG. 3.
Figure 5:
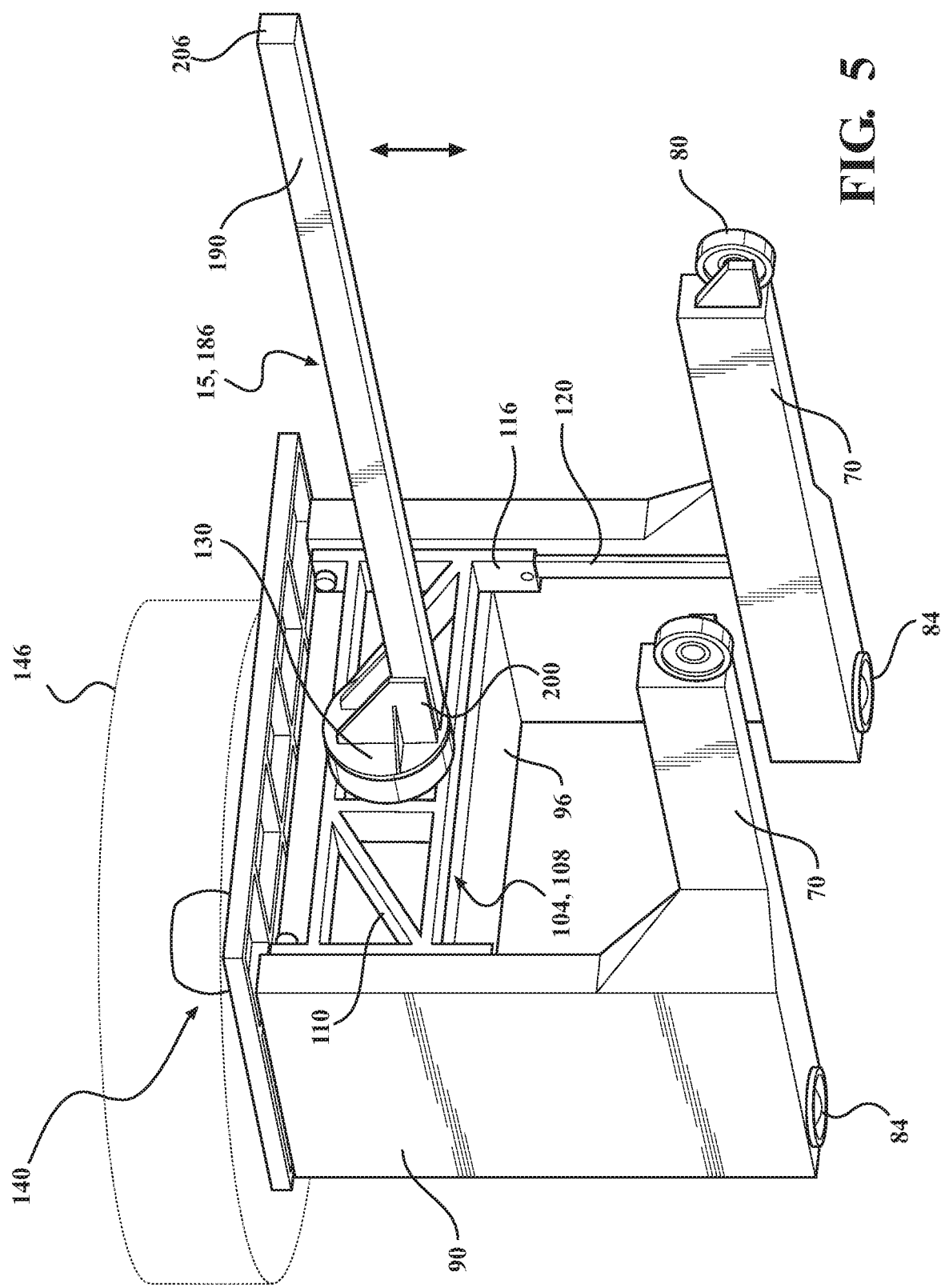
FIG. 5 is an alternate perspective view of the transport device shown in FIG. 2.

Referring to FIGS. 3, 4 and 5, exemplary transport device 14 further includes a manipulator device 104. Manipulator device 104 is operable to move a carrier 15 relative to the frame 66 and workstation 30. In two examples discussed below, manipulator device 104 may take the form of a lift device 108 which is operable to selectively move the carrier 15, for example the first build device 16, from the first position 34 to the second position 40. In another example, the manipulator rotates a mounting plate or support member relative to the frame. Other examples of movement of the carrier and/or workpiece relative to the frame 66 or workstation known by those skilled in the art may be used.

In the example of the manipulator device in the form of a lift, lift device 108 includes a rigid support frame 110. In the example shown, support frame 110 is positioned in the opening 72 and extends across opening width 76 ending with guide plates 116 as generally shown and best seen in FIG. 5. As shown, a mounting plate 130 is connected to the support frame 110. Exemplary mounting plate 130 is used to provide a connection or anchor point for the carrier 15, for example a support device 186 to support frame 110, discussed further below. In one example, mounting plate 130 is rigidly connected to support frame 110. In an alternate example of the manipulator device 104A shown in FIGS. 8, 9A and 9B, mounting plate 130 may rotate relative to support frame 110 about an axis of rotation 134. In alternate examples of the manipulator device (not shown), mounting plate 130 may move relative to support frame 110 in other ways, for example, linearly along the X axis 56, Y axis 58 and Z axis 60 directions.

In one example, manipulator device 104 in the form of lift device 108 includes a powered drive system (not shown) including a track 120 extending along the Z axis 60 on an inner surface of both frame side walls 90 between the first position 34 and the second position 40. Each exemplary guide plate 116 is engaged with a respective track 120 which are in communication with a drive device, for example an electric motor or hydraulic motor and cylinder, to selectively move the support frame 110 along track 120 between the first position 34 and the second position 40. In one example, the drive device may be positioned in the cross member 96.

The drive device (not shown) and track may take many forms, for example toothed gears engaging a rack positioned along the track 120, a chain engaged by driven sprockets, toothed belts, cogged pulleys and/or other drive devices known by those skilled in the art.

In one example, the manipulator device 104 is powered by one or more batteries (not shown) positioned in the cross-member 96 cavity and in electric communication with the manipulator device 104, drive wheels 84, control system 150 and/or other onboard devices requiring electric power. Other sources of electricity or power, for example induction motors, known by those skilled in the art may be used.

Referring to FIGS. 1 and 4, exemplary system 10 and transport device 14 includes one or more sensors 140 having a field of vision 146 to assist in the navigation and/or object detection for transport device 14 to move along the path of travel 24. In one example, sensor 140 is a omni-directional 360 scanner, for example a laser scanner or LIDAR (light imaging, detection and ranging) system, which actively scans, monitors and measures distances between the transport device 14 and distant objects. In the example shown in FIG. 4, additional sensors 140A and 140B having respective fields of vision 146A and 146B, may be used on other locations of the frame 66, cross-member 96 or other areas of transport device 14 to suit the particular application and performance requirements of system 10. In another example (not shown), interior sensors, for example on the inside walls 90 in the clearance opening 72, may be used to detect platform 50 and second build device 46 to guide and position transport device 14 relative to platform 50 and second build device 46. In a preferred example, system 10 and transport device 14 is an autonomous or semi-autonomous device capable of self-driving movement and navigation based on use of one or more of the above sensors in communication with the control system 150 and drive wheels 84.

Other sensors, for example proximity sensors, ultrasonic sensors, global positioning satellite (GPS), or local triangular positioning devices, may be used to assist and/or control the navigation of transport device 14 known by those skilled in the art. Where less sophisticated drive and/or sensor systems are used, for example in automated guided carts (AGC's), other devices, for example wires or paint on the floor readable by a sensor, may be used as known by those skilled in the art.

Figure 6:
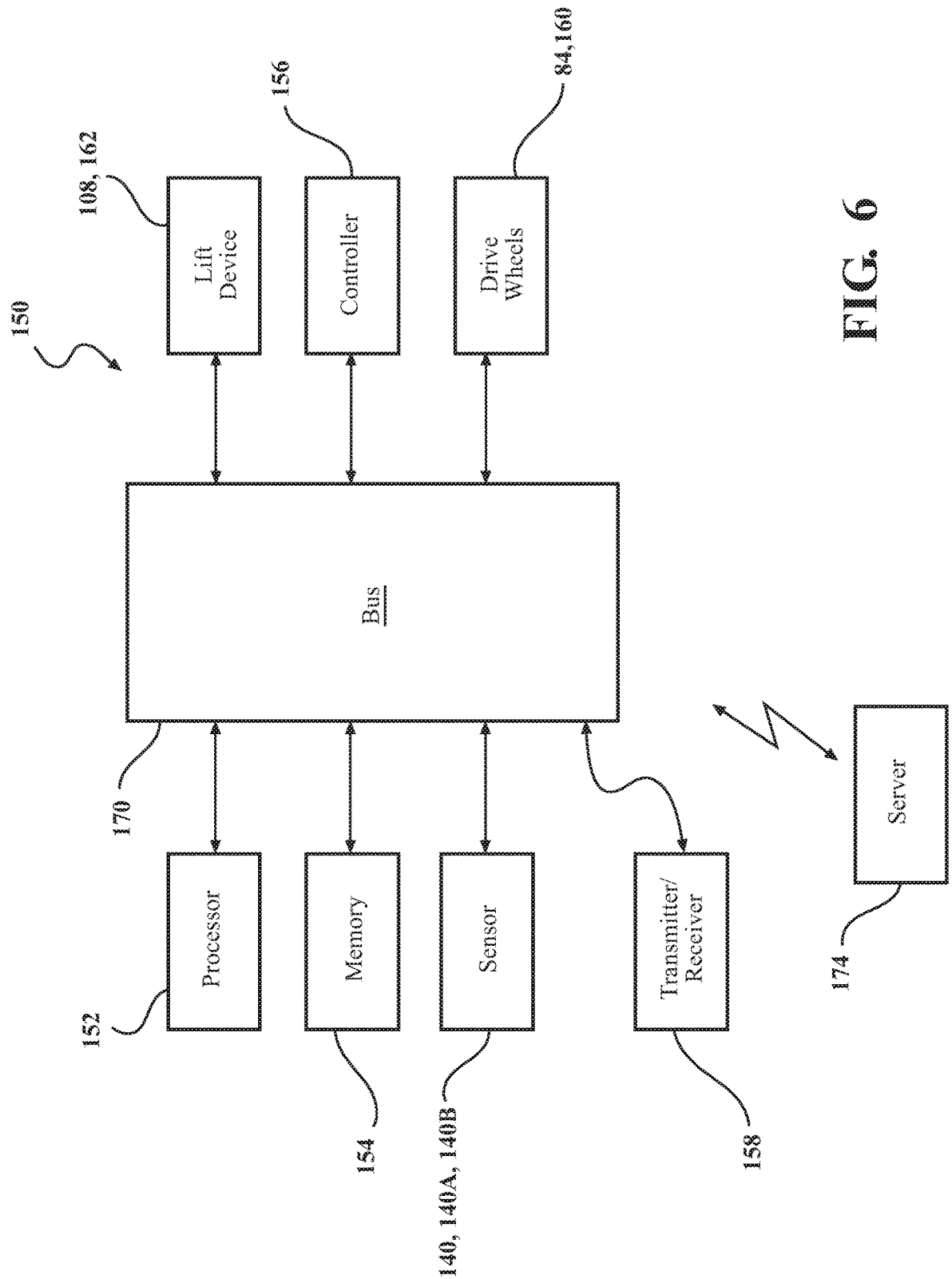
FIG. 6 is a schematic block diagram of an example control system.

Referring to FIG. 6, an example of a control system 150 for system 10 and exemplary transport device 14 is schematically illustrated. In the example, transport device 14 includes a control system 150 useful to monitor, navigate the movement and/or location of transport device 14 along the path of travel 24 as well as actuate and control movement of the drive wheels 84 and the lift device 108.

Exemplary control system includes a microprocessor 152 and a data memory storage device 154. Exemplary microprocessor or central processing unit (CPU) 152 is a conventional or specialized computer processor including an on operating system. The CPU 152 is operable to receive data, for example to send and receive data or instructions from the memory storage device, processes the data according to preprogrammed or stored instructions in its memory and provide outputs. The electronic data or information memory storage device 154 may include one or more of common data/information storage devices to, temporarily and/or permanently, store operating instructions, software and executable instructions to the processor 152 and/or controllers and actuators 156 to send and receive signals to and from the various drive or executable devices discussed above.

Control system 150 may further include one or more conventional or specialized controllers and actuators 156 for controlling and/or monitoring various devices in system 10 or transfer device 14. One or more of the hardware and software components may be a part of a larger programmable logic controller (PLC). Exemplary control system 150 further includes a transmitter and receiver 158 for sending and receiving wireless signals and data between the control system 150 and other devices, for example a local or remote server 174. In one example, control system 150 is in communication and sends and receives data signals from a local server as part of a broader control system. One example of an industrial communication system and method is described in US Patent Application Publication 2010/0241260 assigned to the present assignee the entire contents of which is incorporated by reference. For example, the industrial facility or plant may include a communication network which may include local area network (LAN) including, for example, one or more wireless routers for communication based on an IEEE standard 802.11 (also known as Wi-Fi), or known hardware for communication based on IEEE 802.03 (also known as Ethernet). Other known communication protocols, for example BLUETOOTH suitable for an industrial environment may be used as known by those skilled in the art. These networks may be in communication with a cloud communication network, for example the internet, virtual private network, a private network, a point-to-point network or any other suitable network, or combinations of networks, known by those skilled in the art.

Exemplary control system 150 includes one or more buses 170 which allow communication between the various components described above in control system 150. In the example, the transport device 14 drive wheels 84, lift device 108 and sensors 140, 140A and 140B are in communication with the control system 150 to activate, deactivate, monitor and/or control the operation of the actuators, motors and other devices based on execution of instructions, pre-programmed onboard the device 14, or as received through communication of remote instructional devices, for example remote servers 174. As discussed above, these devices may be powered by a power source, for example rechargeable batteries or battery packs stored in the cross-member 96. Additional hardware and software devices and programs may be used in the control system 150 as known by those skilled in the art depending on the application and performance requirements of system 10.

Figure 7:
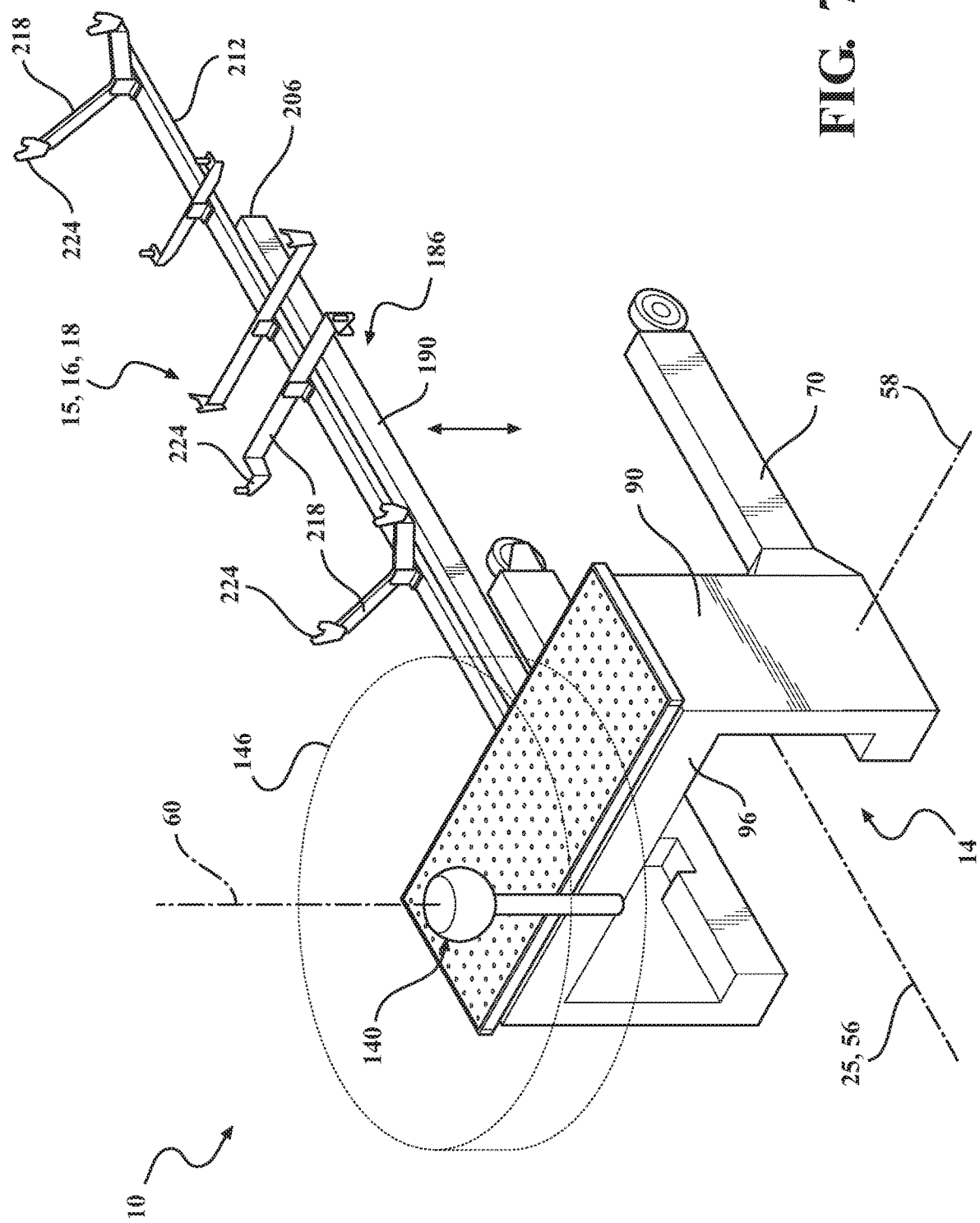
FIG. 7 is a perspective view of an alternate example of the transport device of FIG. 2 including an example of a first build device in the form of a first fixture.

Referring to FIGS. 1, 2 and 7, an example of system 10 and transport device 14 is shown with an example of a carrier 15 in the form of a support device 186 and first build device 16. Support device 186 is useful to engage and support a first build device 16 as generally shown and described below. In the example, support device 186 includes an elongate, rigid support bar 190 having a first end 194 that rigidly or removably connects to the mounting plate 130 through a gusset or mounting bracket 200 as best seen in FIG. 5. The exemplary support bar 190 is made from steel, aluminum or other materials suitable for the particular application.

It is understood that carrier 15, support device 186, support bar 190 and first build device 16 can be an integral, single component or a single device formed from one or more of the mentioned structures. The carrier 15 and/or support device 186 may take forms, shapes, sizes, orientations, numbers and constructions other than elongate support bar 190 as illustrated. In one example not shown, support bar 190 may be configured to be a "U" or "V" shape providing a platform or support surface for a container or other carrying device, for example, loose components or raw materials, as discussed further below.

As best seen in FIG. 2, the exemplary carrier 15 in the form of a support bar 190 may further be in the form of an elongate, rigid bar including a second end 206 and one or more connectors 210 which provide a connection or anchor point for the first build device 16 further described below. The connectors 210 can take many forms which provide a secure mechanical attachment between the support bar 190 and the first build device 16. The connectors 210 can alternately provide a permanent, removable or quick-release type connection to engage first build device 16. Mechanical bolts, mounting studs or locking pins are examples of a removable connector 210. Other forms for connector 210 may be used as known by those skilled in the field. In one example best seen in FIG. 1, a guide 236 is used to assist in the positioning of the support device 186, for example elongate support bar 190, along the Y direction 58. Exemplary guide 236 may include two rigid bars connected to platform 50 extending upward along the Z axis 60 defining a vertical slot to receive and guide bar 190 as the lift device 108 moves between the first position 34 and the second position 40. Rollers or other devices (not shown) may be included to further guide and/or reduce friction and/or wear between the abutting components. Other guide and positioning assist devices, positioned on platform 50 or support device 186, may be used to suit the particular application.

In the preferred example, transport device 14 includes the carrier 15 connected to the manipulator device 104. In a preferred example discussed below, carrier 15 is a first build device 16 further described below. In an alternate example (not shown) carrier 15 can take the form of a container. In the example, the container may be a rigid holding crate or other shipping or transport container useful to temporarily store loose components described above to be transported by transport device 14 from one location to another.

In one exemplary container, the container is a rigid, rectangular shipping crate having an open top allowing easy loading and unloading of loose components identified above. In one example, standard industrial assembly plant shipping crates can be quickly connected to support device 186, for example by a robot or forklift, so transport device can transport the materials to a desired location, for example, from an assembly plant warehouse area to an active assembly line for use in assembly operations. Where the carrier or support member 186 is in a "U" or "V" configuration, the shipping crate can be placed atop of the carrier 15 or mechanically secured through connection devices 210 described above. It is understood that the support device 186 can be integral with carrier 15. For example, the carrier 15 may be easily connected to the storage crates which are then easily connected to the device 14 mounting plate 130. Other carriers 15 having different sizes, shapes, orientations, connection schemes known by those skilled in the art may be used.

In the FIG. 7 example, carrier 15 is, or includes, a first build device 16 in the form of a first fixture 18. First fixture 18 is shown engaged with the support bar 190 through connectors 210 in a manner described above. Exemplary first fixture 18 is a subassembly holding fixture including base 212 in the form of an elongate rigid rod or bar. It is understood that base 212 can be integral with bar 190 (a single bar 190 also serves as base 212). First fixture 18 further includes a plurality of arms 218 connected to the base and part supports 224 connected to the arms 218. Depending on the application and required engagement between part supports 224 and workpiece 20, part supports 224 can take many forms and orientations such as a horizontal support surfaces, hooks, power-actuated clamps in communication with control system 150, or other static or actuated devices needed for support and/or secure engagement with the respective portion of workpiece 20. Arms 218 and part supports 224 are made from steel, aluminum or other materials suitable for the application. The number, location, size, configuration and orientation of first fixture 18, first fixture arms 218 and 224 will vary depending on the workpiece 20 the support device 186 is designed to accommodate.

In alternate examples of first build device 16 (not shown), first build device 16 can take the form of other holding fixtures for transporting individual components or articles by transport device 14. For example, first build device 16 can include a flat or multi-level sheet of steel or aluminum with precision-positioned holes (for example a grid pattern having precision aligned holes 100 mm apart) and individual brackets or tooling for positioning individual assembly components, subassemblies, tooling and/or equipment relative to the steel sheet. The precisely positioned components can be removed from the first build device 16 by a robot or other manipulator to support assembly operations at the workstation or other processes. Other holding fixtures, welding fixtures, component assembly or positioning devices, tooling, equipment end effectors, equipment maintenance devices, for example weld tip dressing tools, and/or tooling can serve as the first build device 16 or the second build device 46 to suit the particular application.

Other examples of devices that can be included or supported on the first build device 16 or the second build device 46 are described in US Patent Application Publication Number 2015/0128719 the entire contents of which is incorporated herein by reference. For example, where the transport device is used in an assembly line equipment maintenance capacity, replacement end effectors, weld gun tip dressers, processing testing equipment, for example weld gun test coupons, may be positioned on carrier 15 or first fixture 18. In another example, process evaluation or maintenance equipment maybe be mounted to carrier 15 or first build device 16. For example, cameras or other imaging devices may be mounted to carrier 15 and transported to a desired location and workstation to image or otherwise record a process cycle to ensure the process is conducted according to design specifications. Other carriers 15, first build devices 16 and first fixtures 18 may be used to suit the particular application and as known by those skilled in the art.

Figure 8:
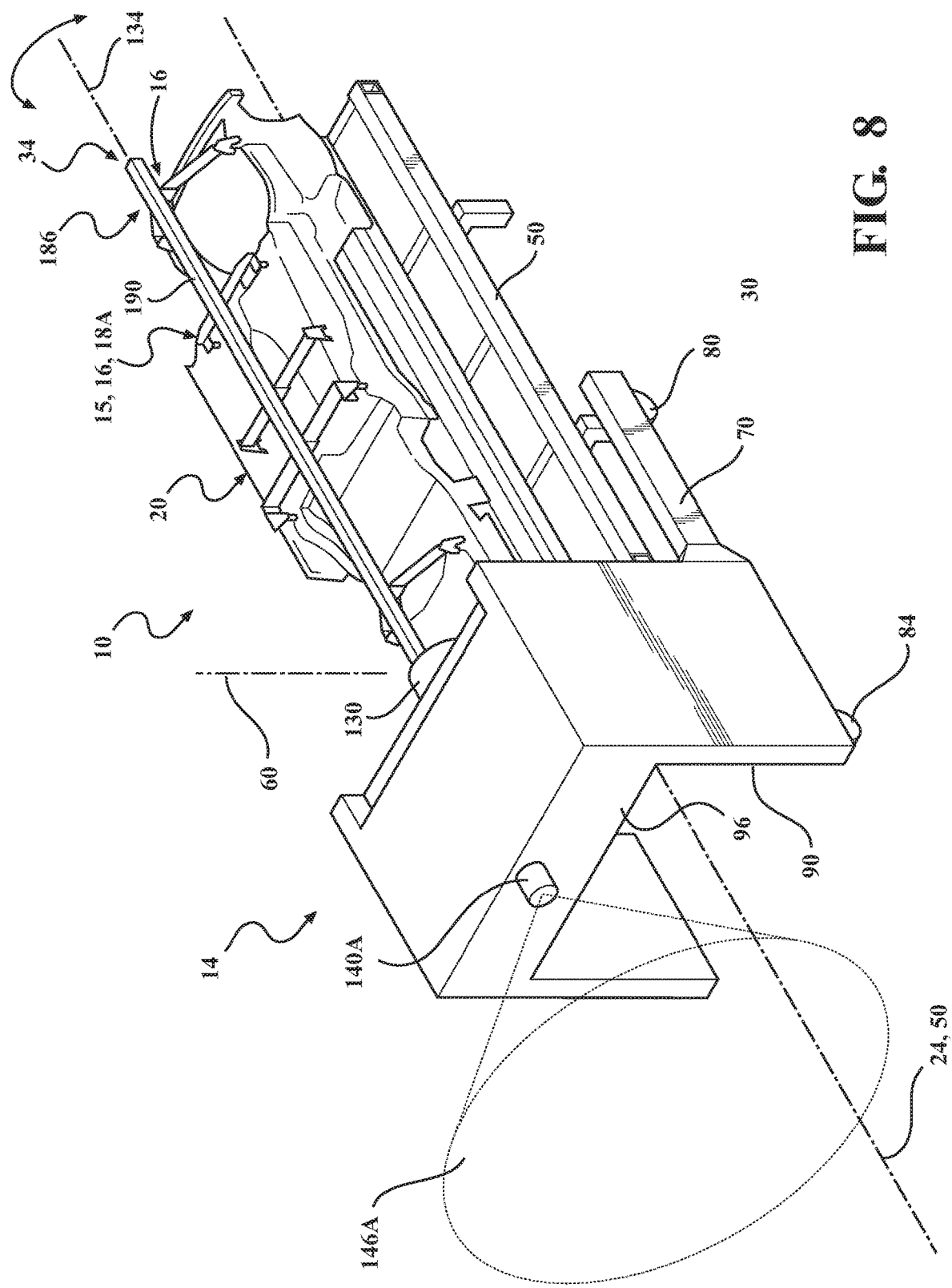
FIG. 8 is a perspective view of an alternate example of the transport device of FIG. 7 including an alternate example of a first fixture.

Referring to FIG. 8, an alternate example of the manipulator device 104 and carrier 15 is shown. In the example, carrier 15 in the form of a first build device 16, includes an alternate first fixture 18A used to vertically suspend workpiece 20 below the first build device 16 along the Z axis 60 as generally shown. Alternate first fixture 18A includes alternate arms and part supports than as generally described for FIG. 7 above. Where a second build device 46 (not shown) is used and positioned on platform 50, the work supports 224 may include powered actuated clamps, hooks or other articulatable engagement devices in connection with control system 150. Once workpiece 20 is engaged with the second build device 46, the work supports 224 would be actuated to release engagement with workpiece 20. In another example, the parts supports 224 may continue engagement with the workpiece, but allow flexibility of movement so the workpiece can fully engage second build device 46 for accurate and precise positioning and orientation of workpiece 20 in the X, Y and Z axis directions on the second build device 46 for predetermined processing at the workstation 30.

In one example not shown, one or more sensors may be used to determine the location of the carrier 15, or of the arms and/or part supports, to monitor the respective positions of the carrier, respective arms, part supports or the workpiece. For example, on visual determination that the workpiece is engaged with the second build device 46, the part support actuators could be actuated (or opened) allowing disengagement of the workpiece 20 from the first fixture 18, 18A allowing the lift device 108 to raise or otherwise move the first fixture 18, 18A out of the way so predetermined processing can take place on the workpiece, for example by programmable robots disclosed below. Exemplary sensors may include cameras or other optical imaging devices. Other sensors known by those skilled in the art may be used.

Referring to FIGS. 9A and 9B, an alternate transport system 10A is illustrated. In the example, the transport device 14A is similar to that described above, but with an alternate manipulator device 104A and no use of a second build device 46. In the example as best seen in FIG. 9A, alternate manipulator device 104A provides for rotation of mounting plate 130 about an axis of rotation 134 to selectively reorient carrier 15 in the form of the first build device 16 and workpiece 20 relative to the frame 66 and/or workstation 30. One exemplary application is to reciprocally rotate workpiece 20 in the workstation 30 to provide additional access or clearance to inspect the workpiece 20 by an operator as generally shown. Alternate manipulator device 108A may also include lift device 108 to reciprocate between the first position 34 and the second position 40 along the Z axis 60 as previously described for lift device 108.

In the example of alternate manipulator device 104A, mounting plate 130 (and carrier 15) is operable to rotate relative to support frame 110. In an alternate example, mounting plate 130 includes structures, for example planetary gears or journal bearings to engage carrier 15, for example support device 186, thereby allowing support device 186 to rotate relative to mounting plate 130. A drive motor (not shown) is in communication with the control system 150 and is engaged with the rotating component to ultimately rotate carrier 15 as generally shown. Other structures, components and devices for rotating carrier 15, for example first build device 16, known by those skilled in the art may be used.

Referring to FIGS. 3 and 4 one example of operation of system 10 and transport device 14 including a first build device 16 in the form of the above-described first fixture 18 and a second build device 46 in the form of a second fixture 48 is shown. In the example, transport device 14 is preprogrammed, or otherwise receives data signal instructions in real time through wireless communication in one of the forms described above, to move along the predetermined path of travel 24, 56. In the example where transport device 14 is in the form of an autonomous or semi-autonomous AGV, the transport device 14 is logistically monitored and/or navigated through use of sensors 140, 140A, and 140B in communication with control system 150. In an alternate example, transport device 14 may not be preprogrammed with onboard instructions in the control system 150 with a predetermined path of travel. In this alternate example, the transport device 14 may receive wireless data signal instructions in real time (or close thereto) from a local or central plant control system to guide the transport device 14 along a desired path of travel. For example, the transport device 14 course or path of travel can be altered "on-the-fly" by receipt of data signal instructions which change or alter the path of travel from a prior destination to an alternate destination to pick-up or transport materials to better support plant or assembly operations.

In the example illustrated, when transport device 14 is positioned along the path of travel 24 between workstations 30, first build device 16 and workpiece 20 are located at the first position 34. As transport device 14 enters exemplary workstation 30, the second build device 46 is positioned along the path of travel 24, and is sized and oriented, to pass through transport device clearance opening 72 as the frame 66 continues to move along the path of travel 24. Through use of sensors 140, 140A, 140B, other sensors (not shown), or other position locating system, for example a closed-loop feedback system incorporated in control system 150 and/or an industrial plant central control center, the transport device 14 stops movement along the path of travel 24 positioning first build device 16 in the position shown in FIGS. 3 and 4, positioned above second build device 46.

On verification of the proper position of transport device 14 and/or first build device 16 relative to the workstation 30 and/or second build device 46, the lift device 108 is actuated by control system 150 to lower support frame 110 along the Z axis 60 from the first position 34 to the predetermined second position 40 as best seen in FIG. 3. In the example, the first build device 16 and the second build device 46 are configured such that on movement of the first build fixture 16 between the first position 34 and the second position 40, there is clearance defined by the second build device 46 such that there is no physical contact or interference between the first build device 16 and the second build device 46. In the example, on moving transition of the first build device 16 between the first position 34 and the second position 40, the second build device, for example second holding fixture 48, engages the workpiece 20 (shown in dashed line in FIG. 3) which simultaneously disengages the workpiece 20 from the first fixture 18. In one example, precision locating pins 230 are located on the arms or part supports of the second fixture 48 which engage precision located holes in the workpiece 20. Other mechanical devices other than locating pins 230 may be used to engage and position workpiece 20 relative to the second build device 46 as known by those skilled in the field. In the example, the first fixture 18 would continue to lower in the Z direction 60 after disengagement to, for example, provide additional clearance or avoid interference with the workstation operations.

In the FIG. 3 example, second build device 46 is positioned in the workstation 30 in a known, accurate and precise location in the X coordinate or axis 56, the Y coordinate or axis 58, and the Z coordinate or axis 60 relative to the workstation 30 and process equipment positioned therein. In one example, second build device 46 can position workpiece 20 within +/−0.15 millimeters (mm) from a target or predetermined design position. Other dimensional variations from a target position may be used or achieved depending on the form or configuration of system 10 and transport device 14. It is understood that second build device 46 and second fixture 48 can take other forms, shapes, sizes (within the size of the clearance opening 72), orientations and structures to suit the particular application.

Equally, the construction and configuration of the exemplary second build device 46 and second fixture 48, for example arms and part supports, which engage and support workpiece 20 to position and orient workpiece 20 in a known, accurate and precise location in the X coordinate or axis 56, the Y coordinate or axis 58, and the Z coordinate or axis 60 relative to the workstation 30, may vary. On completion of the predetermined work processes on the workpiece 20 at the workstation 30, the control system 150 actuates, for example electric motors described above, and begins to raise the lift device 108 to re-engage the first build device 16 (for example first fixture 18) and disengage the workpiece 20 from the second build device 46 to reposition the lift device and workpiece 20 at the first position 34.

On confirmation or verification that the lift device 108 has returned to the first position 34 and/or the first build device 16 has re-engaged work piece 20, control system 150 actuates the drive wheels 84 to continue movement of the transfer device 14 along the path of travel 24 to the next predetermined workstation 30 or other destination. Although path of travel 24 has been described as along an X axis, it is understood that the system 10 and device 14 path of travel can take forms other than a linear path. In the example of transport device 14 in the form of an AGV, an almost unlimited number of paths of travel 14 can be predetermined, or self-navigated by device 14, or guided by real-time wireless instructions, by the transport device 14 through use of sensors 140, 140A, 140B and other sensors and navigating devices and systems described above. In one example, a substantial portion of the path of travel 24 may be linear, for example along a long, continuous assembly line. Alternately, path of travel 24 can have curved portions, for example moving from one linear assembly line to another, or for example, from an assembly line to another area of the assembly facility. For example, if an error is detected in the process, the transfer device 14 can be instructed/directed through receipt of data signals described above to alter its prior programmed (or non-programmed) path of travel and move to an inspection area adjacent to, or remote from, the assembly line path of travel 24.

Figure 10:
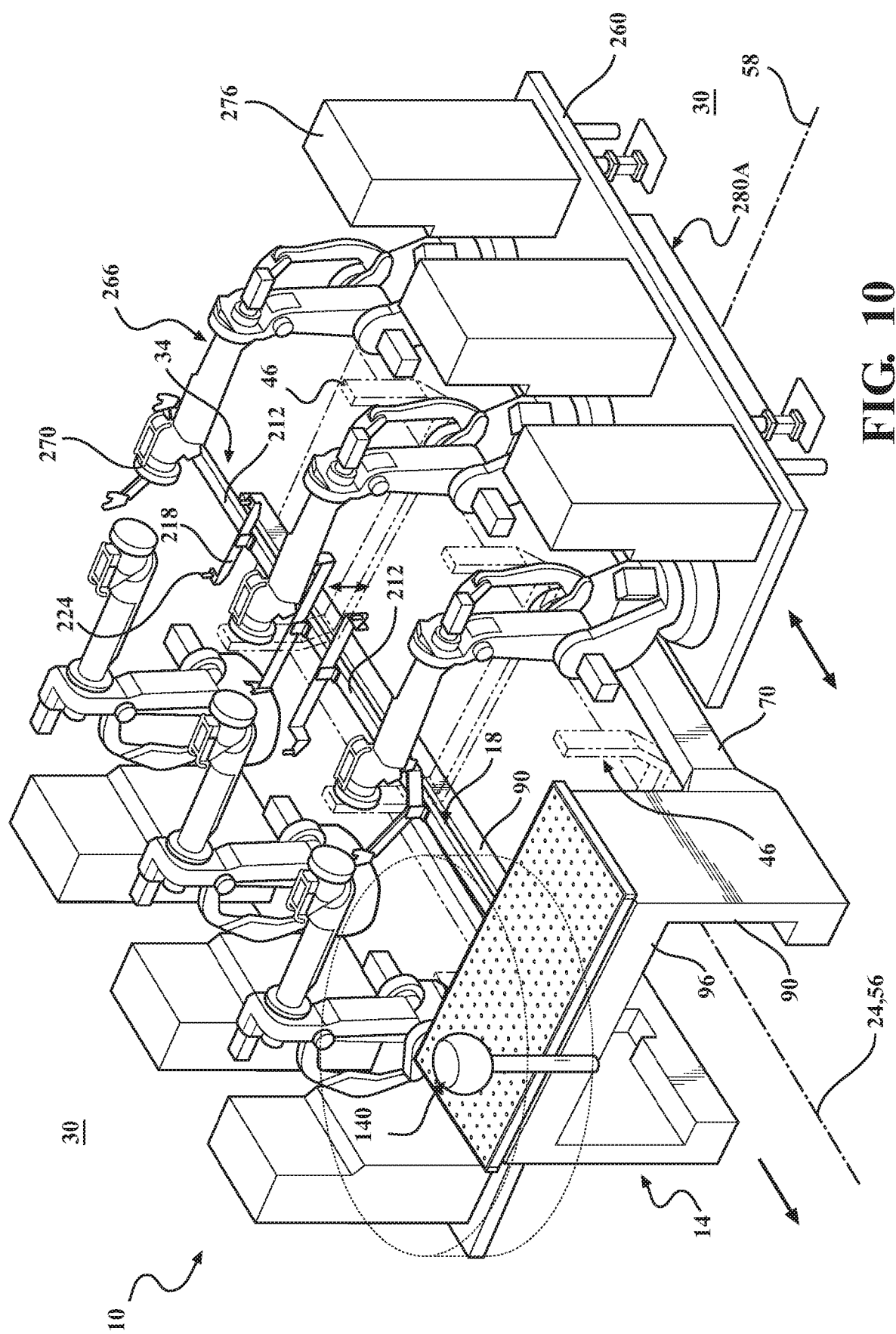
FIG. 10 is perspective view of an alternate example of the transport system of FIG. 1 in use with a workstation including robots.
Figure 11:
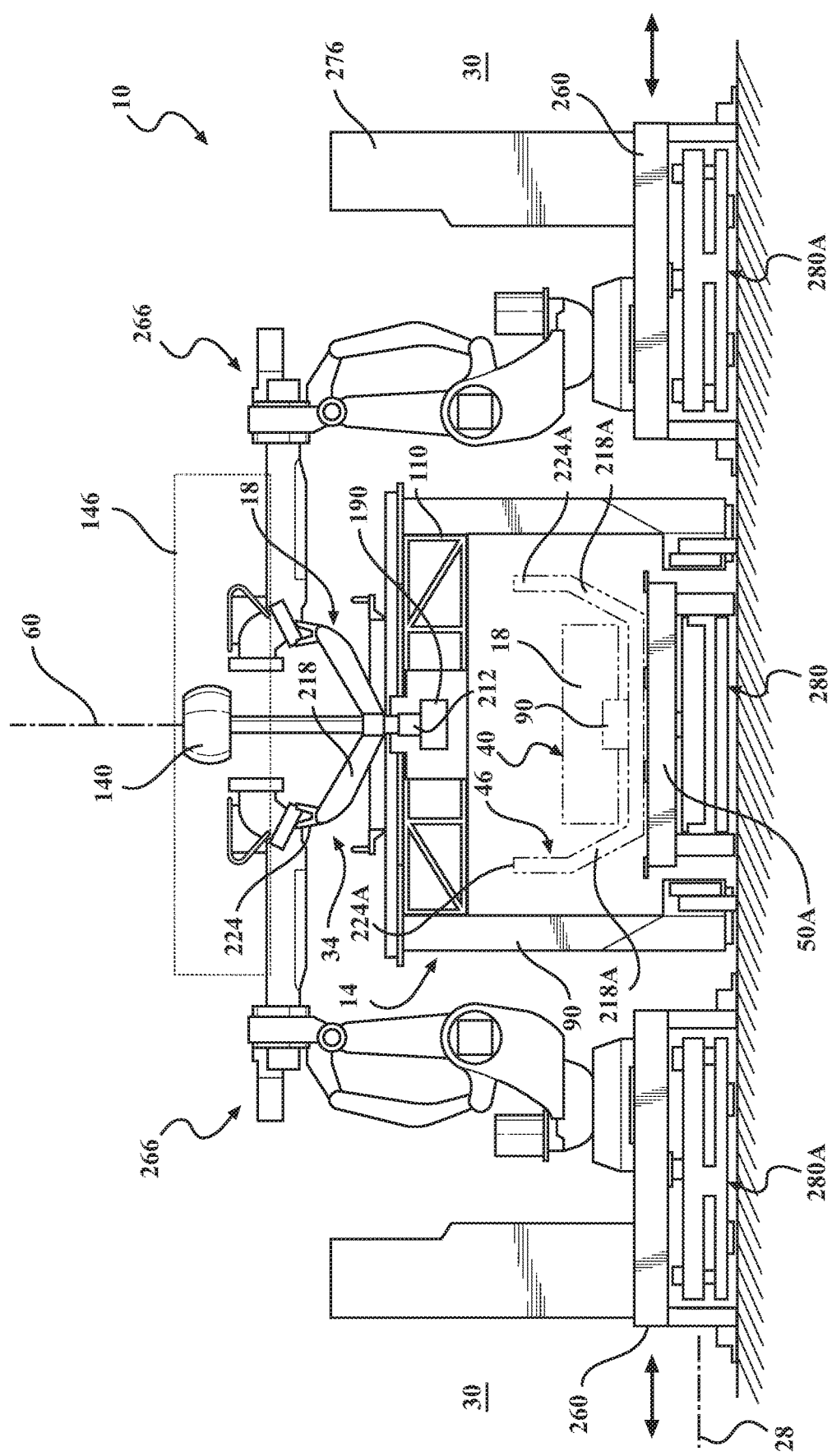
FIG. 11 is a rear end view of the transport system of FIG. 10.

Referring to FIGS. 10 and 11, exemplary transport system 10 is shown in use with exemplary process equipment at a workstation 30. In the example, a transport device 14 including a first build device 16 is used with a second build device 46 generally described above. In the FIG. 11 example, second build device 46 (for example second fixture 48) is positioned on an alternate platform 50A which is movable in the X direction 56 and the Y direction 58 through use of an independent AGV 280. AGV 280 and platform 50A may also move the second build device in the Z axis 60 direction to suit the particular application. It is understood that second build device 46 can be positioned and secured to a stationary platform 50 as previously described.

In the example illustrated, exemplary AGV 280 may selectively engage platform 50A and move the platform 50A and connected second build device 46 to a selected position along the path of travel 24 or other location in the workstation 30. Connection or engagement mechanisms between the AGV and the platform 50 may include engagement pins that are actuated to rise and engage coordinated holes or areas of the platform 50 to raise and lower the platform 50 relative to the AGV 280 to position and move platform 50A as needed. Other engagement devices between the AGV 280 and the platform 50A may be used to suit the particular application as known by those skilled in the art.

For example, a plurality of second build devices 46 and platforms 50A can be built and configured so selected second build devices 46 are specific to or designed for a workpiece, product or article A, and some built and configured for a different workpiece, product or article B. The AGV 280 can be preprogrammed or wirelessly instructed to engage, maneuver, insert and position the proper second build device 46 into the path of travel to accommodate the predetermined industrial plant build sequence of workpieces, products or articles, for example, different vehicle body styles, to meet varying production demand. Equally and alternately, system 10 and transport devices 14 can be selectively transferred to locations or workstations where the appropriate second build device 46 is positioned to coordinate with the workpiece 20 carried by the transport device 14. This provides significant flexibility to assembly process facilities and is efficient in the floor space and configuration of the industrial facility.

In the FIGS. 10 and 11 example, system 10 and workstation 30 includes two sets of platforms 260 supporting programmable robots 266 and associated robot controls cabinets 276 (three robots 266 and control cabinets 276 shown on each platform 260 for each side of the path of travel 24). In the example illustrated, the platforms 260 are selectively engageable and positioned adjacent the system 10 path of travel in a workstation 30 through use of independent AGV's 280A as previously described for AGV 280. In the example, platforms 260 may move perpendicular to the path of travel direction 24, 56 along Y axis 58 or parallel to the path of travel direction 24, 56. In one example, on a workpiece or model switch to an alternate workpiece or model, different process equipment, for example alternately programmed robots 266 or other assembly or manufacturing process equipment can be autonomously, or semi-autonomously, moved into the workstation 30 and adjacent to the path of travel 24 by the AGV's 280A for predetermined process engagement with workpiece 20 positioned on the first build device 16 or the second build device 46. For example, one set of robots may conduct processes on workpiece 20 while the workpiece 20 is engaged with the first build device 16 at the first position 34 (shown in FIG. 11). In the same workstation 30, the workpiece 20 can be lowered or reoriented by transport device 14 lift 108 to the second build device in the manner described above for additional operations on workpiece 20 by alternate robots or equipment.

In one example, platforms 260, robots 266 and control cabinets (or control systems) may be modular, self-contained systems wherein the platform or pallet 260 and installed process equipment is prebuilt, pre-tested or validated away from the assembly line and delivered to the plant facility. The modular platform is then delivered to the workstation, connected to a power source and placed in communication with the control system (by hardwire or wireless) and rendered production ready with little or no downtime of the assembly process. One example of the described modular application equipment pallets or modular assembly tool devices are described in United States Patent Application Publication Number 2016/0167724 assigned to the present assignee and the entire contents incorporated by reference.

In one example not shown, safety fencing (not shown) may be positioned perpendicular to the assembly line on either side of the workstation 30 (extending outwardly along the Y coordinate direction 58). Further, a portion of safety fencing (not shown) may be connected to the platform 260 extending along the outboard side parallel to the path of travel direction 24, 56. On moving of the platform 260 into the workstation 30 and adjacent to the path of travel 24, the perpendicular-positioned fencing and the fencing connected to the platform 260 form a three-sided safety fence structure to prevent unauthorized access to the robots 266 and control cabinets 276. Other safety fencing or safety structures may be used to suit the particular application. In an alternate example, other safety devices, for example sensors may be installed to the platforms 260 to detect unauthorized objects within a certain area of workstation. On detection of an unauthorized object within a perimeter or field of vision of a safety sensor, the control system 150 or control system of the robots 266 may stop movement and production process until the detected object is no longer detected or a signal is received that it is safe to recommence operations in the workstation 30.

In an alternate example, the platforms 260 and robots 266 can be permanently or semi-permanently stationed or secured in a particular workstation 30 so as to conduct the same or similar processes on predetermined workpieces 20 that the system 10 transfers into as described in the above examples. It is understood that other process equipment other than programmable, multi-axis robots 266 and platforms 280A may be used with, or included in, system 10.

Figure 12:
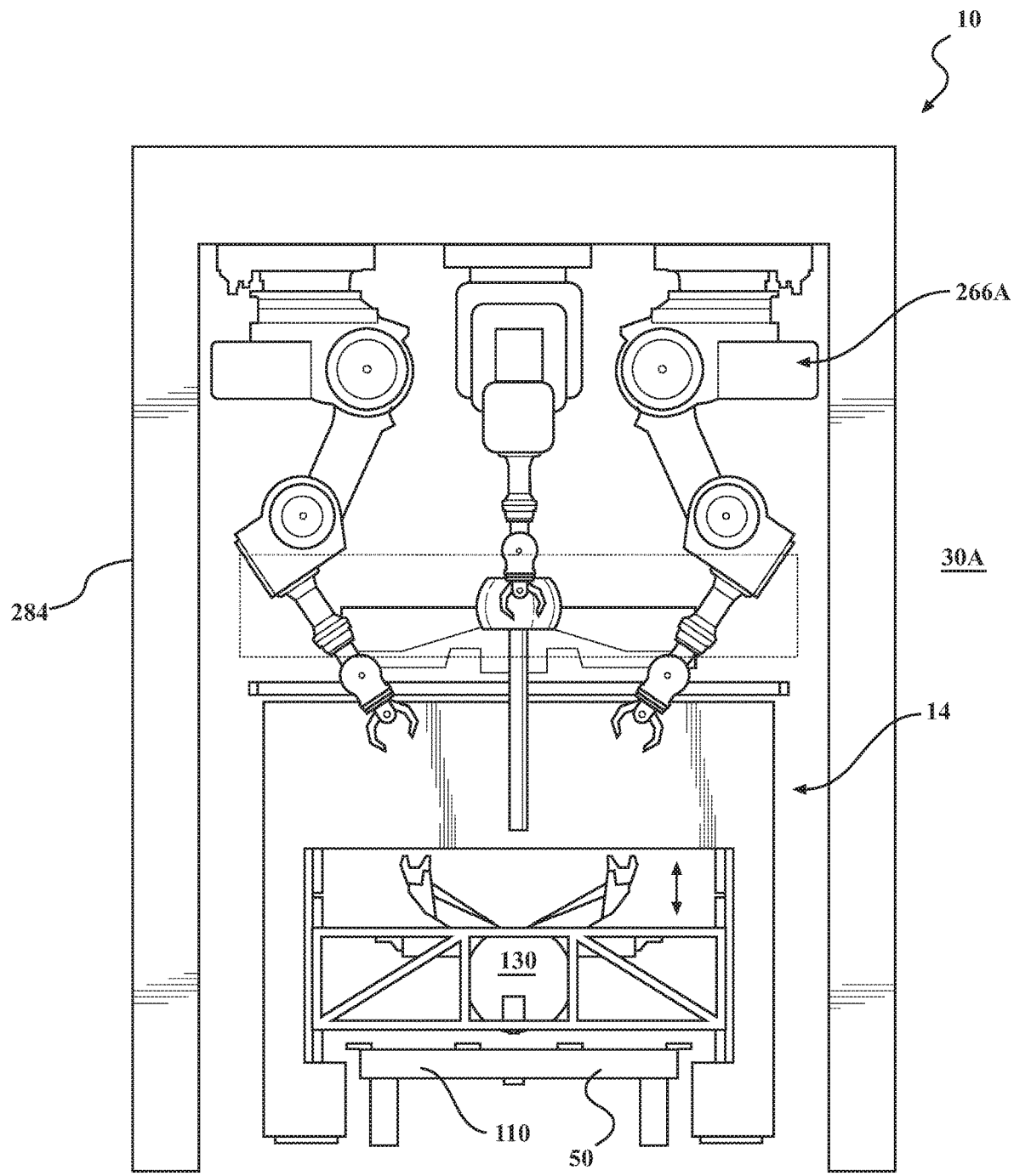
FIG. 12 is an end view of an example of the transport system in use with a workstation having elevated, inverted robots at a workstation.

Referring to FIG. 12, an alternate application of transport system 10 is illustrated. In the example, the process equipment, for example programmable process robots 266, are positioned on overhead structures rather than at ground level through platforms 260 as described for FIGS. 10 and 11. In the example, an overhead, rigid scaffold-type frame structure 284 may be used to support inverted robots (schematically shown as 266A) to conduct work on the workpieces transferred through workstation 30 by system 10 and devices 14 as described above. One example of an overhead scaffold or support structure is described in U.S. Pat. No. 8,201,723 assigned to the assignee of the present invention and incorporated herein by reference. Other infrastructure or devices for supporting robots or other assembly or manufacturing equipment may be used to suit the particular application.

Figure 13A:
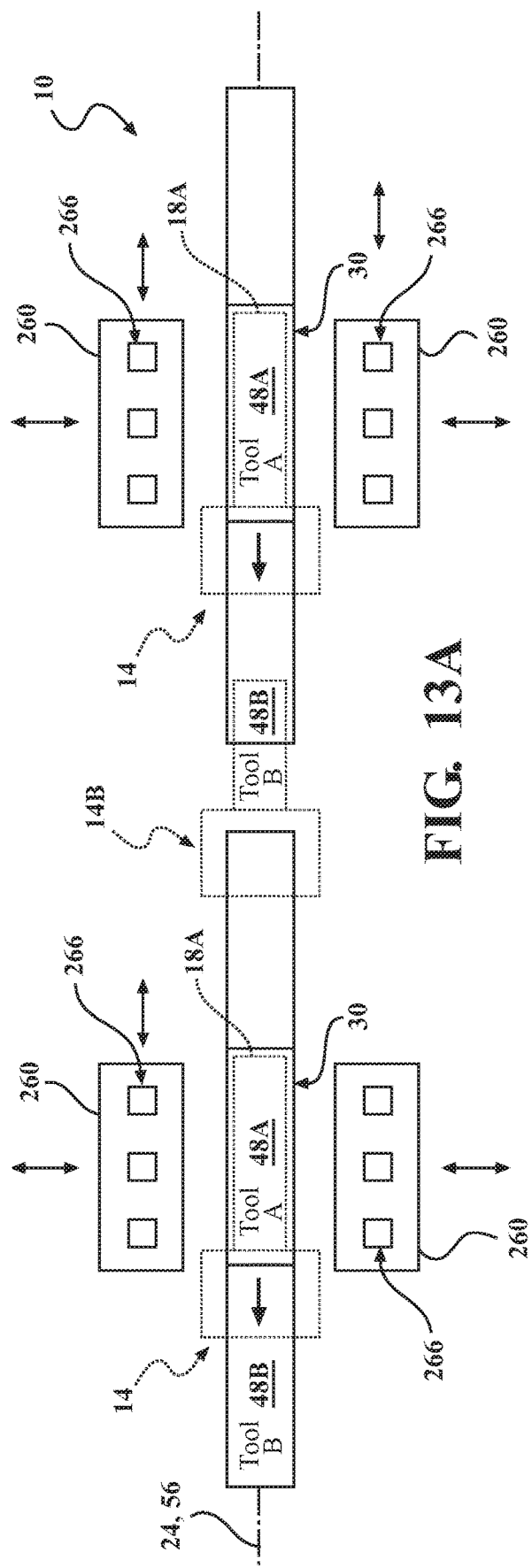
FIGS. 13A-13C are schematic plan views of one example application using two tools per workstation wherein the tools are used in alternate positions at a workstation.
Figure 13B:
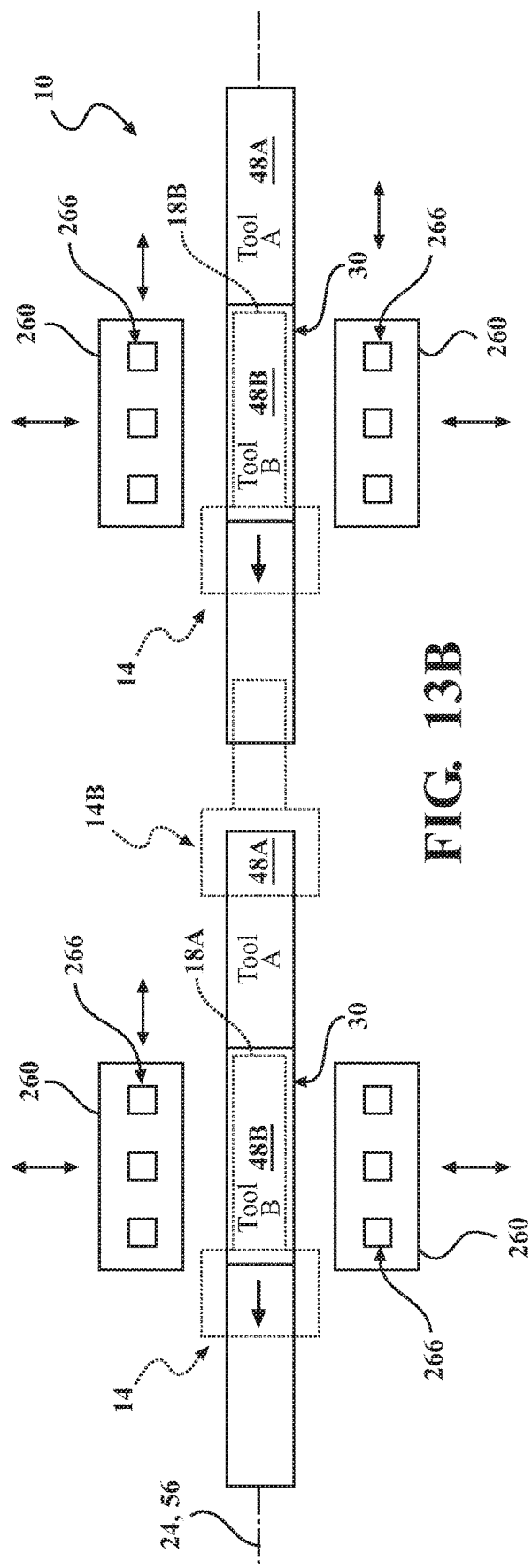
Figure 13C:
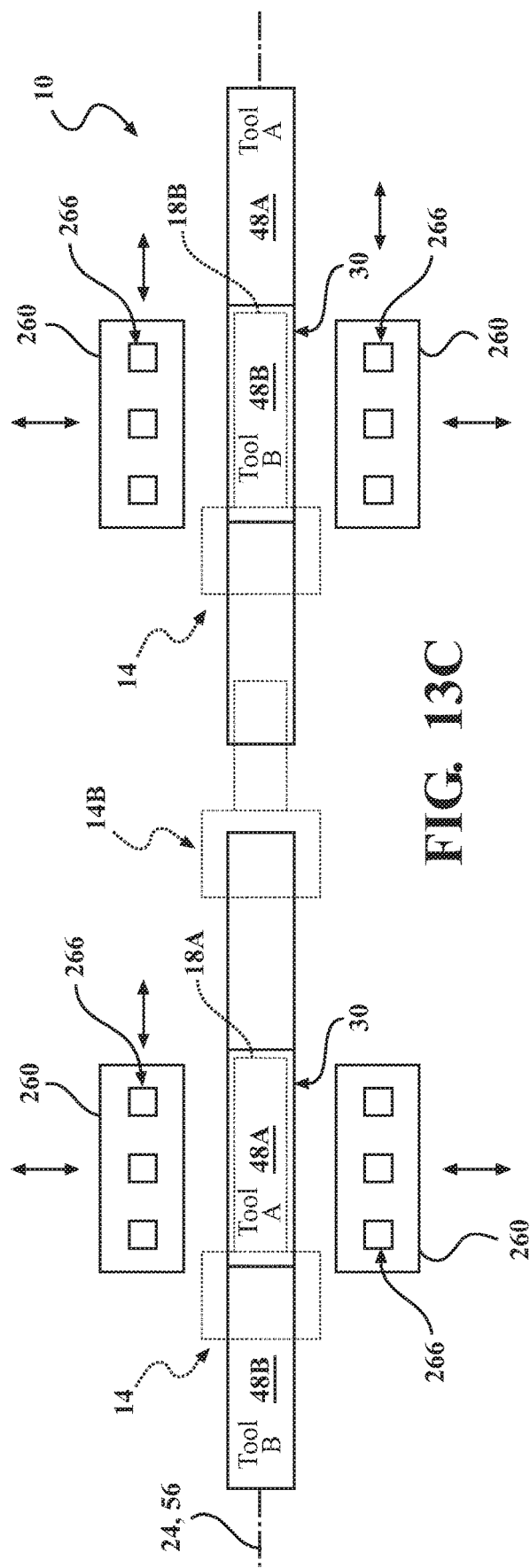

Referring to FIGS. 13A-13C an exemplary use of system 10 along path of travel 24 is illustrated. In the example, two different sets of tools or second fixtures 48 are used to service a single workstation 30 (two workstations 30 shown). Each workstation 30 is equipped with a second fixture 48 in the form of tool A 48A and a second fixture 48 in the form of a tool B 48B. The second fixture tool A 48A and second fixture tool B 48B are supported by platforms 50A (not shown in FIG. 13, but see FIG. 11) and reciprocally moved, for example by AGVs 280, along path of travel 24 into and out of workstation 30 where the exemplary platforms 260 supporting exemplary robots 266 are positioned to conduct predetermined work on workpieces 20 transported by transport devices 14 (shown in dashed line) as previously described. Second fixtures 48 tool 48A and 48B maybe be moved into and out of the workstation 30 by a respective AGV 280 previously described and illustrated in FIG. 11. Other powered devices may be used to move the second fixture tools 48A and 48B into and out of the workstation 30. For example, a powered roller or belt drive system or shuttle (not shown) engaged with a respective tool A or B, as known by those skilled in the field.

Referring to FIG. 13A, the workstations 30 each have received a second fixture tool A 48A adjacent to the robot platforms 260 (each tool A 48A moved from right to left in FIG. 13A). Second fixture tool A 48A's may be moved to the workstation 30 based on a predetermined work or production schedule sequence, or other predetermined metric. The instructions or signals to monitor, initiate and control movement of the second fixtures 48 tools 48A and 48B may be coordinated and executed by a local communication system, for example in each workstation 30 control system (not shown), locally per an assembly line, or remotely through a plant facility central control system (see central server 174 in FIG. 6). Sensors (not shown) may be used along with the control system to monitor the movement and position of the second fixtures 48 as they move into and out of respective workstations 30. One example of an industrial communication system and method for monitoring and controlling movement of the transfer devices 14 and device for reciprocally moving second fixture tools 48A and 48B is described in US Patent Application Publication 2010/0241260 which is incorporated by reference.

Referring to FIG. 13B, an alternate example of second fixture 48 tools 48B are moved to the respective workstation 30 (tools 48 B moving from left to right from the position shown in FIG. 13A) following movement of tools 48A out of the workstation 30 (tools 48A moving from left to right from the position shown in FIG. 13A). One example for changing the second fixtures 48 from tool A to tool B include changing of assembly production from a vehicle model A to a vehicle model B. As described above for FIG. 11, the platforms 260 and associated robots 266 may also change and move into and out of workstation 30 to accommodate which workpiece 20 is entering the workstation 30. Coordination, activation and execution of the equipment in workstation 30 at a particular time can be instructed, monitored and controlled by local or remote control systems as described above.

Referring to FIG. 13C, another example application and operation for system 10 is shown. In the example, one workstation 30 includes second fixture tool A 48A (workstation to the left in FIG. 13C) and one workstation 30 includes second fixture tool B 48B (workstation to the right in FIG. 13C). Other combinations, and/or alternate or additional second fixture tools 48 may be used to suit the particular application.

Referring to FIGS. 13A-13C, illustrated is a third transport device 14B positioned between the two sequential workstations 30. In this middle position, transport device 14B is preferably not being processed by robots 266 or other devices, but is waiting in line or queue to travel into the next workstation 30 (to the left as shown in FIG. 13A). This extra or waiting transport device 14B, may provide for inspection, or sub-processing operations, or be eliminated, depending on the application.

Figure 14:
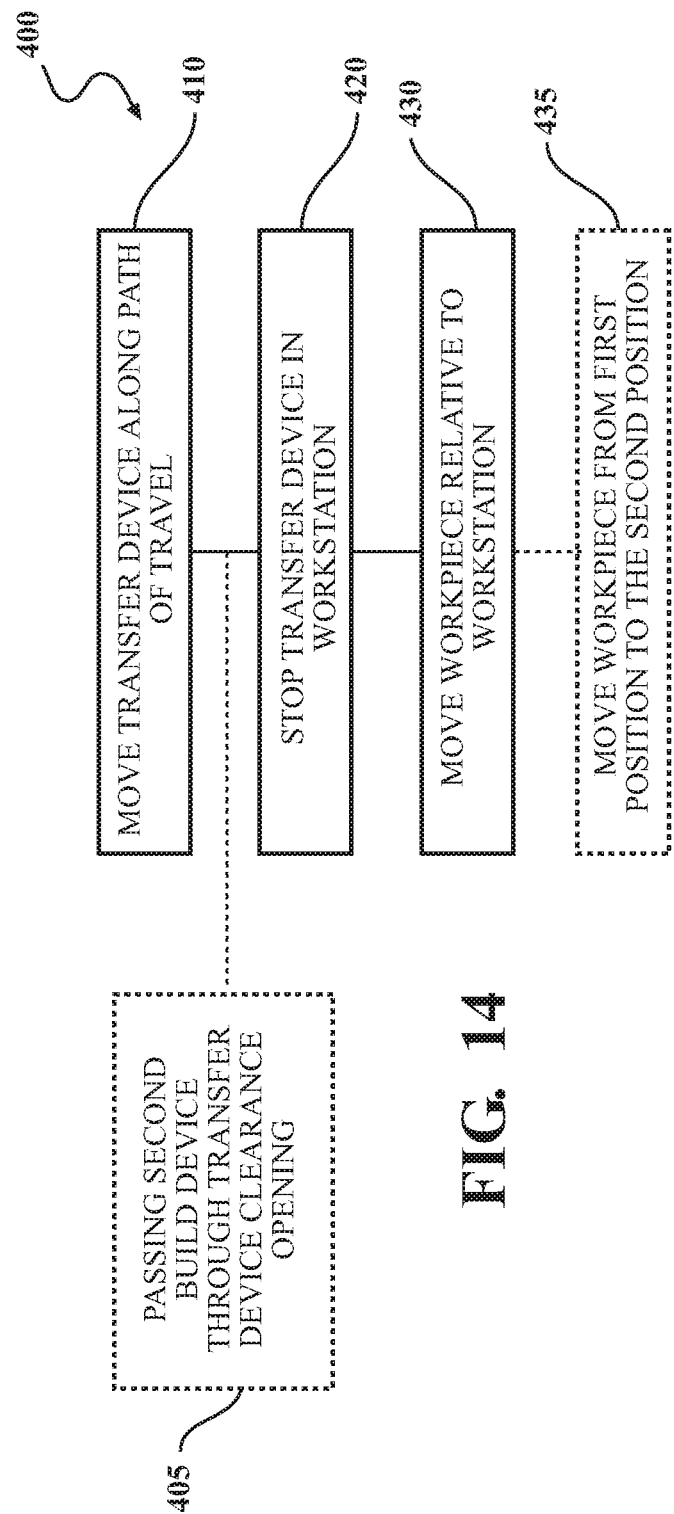
FIG. 14 is a schematic flowchart of an example of a method for transporting and positioning a workpiece at a workstation.

Referring to FIG. 14, an example of a method 400 for transporting materials and/or transporting and positioning a workpiece 20 at a workstation 30 is shown. In the example first step 410, a transport device (for example 14) including a first build device (for example first build device 16 and first fixture 18) is moved along a path of travel (for example 24).

In an exemplary second step 420, the transport device 14 is stopped at a workstation 30. In the examples described above, positioning and stopping of transport device 14 at a predetermined position in the workstation 30 is monitored and executed by control system 150.

In one method example step 430, the transport device 14 causes the first build device 16 and workpiece 20 to move relative to the workstation 30, for example lowering in the Z axis 60 or rotating the workpiece about a rotational axis 134 by lift 108 as described above.

In an alternate additional method step 405 where a second build device 46 is positioned along the path of travel 24, on moving the transport device 14 into the workstation 30, the second build device 46 passes through clearance opening 72 in the transport device 14 as described above.

In an optional additional method stop 435, moving the workpiece 20 relative to the workstation includes the additional step(s) of moving the first build device 16 and workpiece 20 from the first position 34 to the second position 40, thereby depositing the workpiece 20 into the second build device 46 and disengaging the workpiece 20 from the first build device 16 as described above. In example method step 435, additional method steps (not shown) include conducting processing on the workpiece 20 and returning the first build device 16 to the first position 34 thereby re-engaging workpiece 20 as described above prior to the control system reactivating the drive wheels 84 to recommence movement of transport device 14 along the path of travel 24 to the next predetermined workstation 30 or other destination.

It is understood that additional or fewer of the above described method steps may be used, and may occur in a difference order sequence than that described above depending on the application as known by those skilled in the field.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An assembly transport system for use in assembly or logistics operations, the transport system comprising:
 a transport device operable to transport a workpiece along a path of travel in communication with a workstation, the transport device further comprising:
  a frame comprising:
   a pair of side walls separated along a Y-axis; and
   a cross-member connected to the pair of frame side walls, the frame side walls and the cross-member defining a clearance opening having a clearance opening width along the Y axis and a clearance opening height along a Z axis through the transport device along a X axis;
  a drive system connected to the frame, the drive system operable to selectively move the transport device along the path of travel;
  a manipulator device supported by the frame, the manipulator device movable relative to the frame;
  a carrier connected to the manipulator device operable to support a workpiece transported by the transport device;
  a sensor connected to the frame operable to assist in navigating movement of the transport device along the path of travel; and
  a control system in communication with the sensor, the drive system and the manipulator device, the control system operable to autonomously or semi-autonomously move and navigate the transport device along the path of travel and the manipulator device relative to the frame.

2. The transport system of claim 1 wherein the manipulator device comprises a lift device further comprising:
 a guide track connected to each frame side wall extending along the Z axis;
 a lift support frame positioned in the clearance opening and engaging each guide track;
 a mounting plate connected to the support frame, the mounting plate operable to engage and support the carrier;
 a motor supported by the frame in communication with the lift support frame and the control system, the motor operable to selectively move the support frame and mounting plate along the Z axis relative to the frame.

3. The transport system of claim 2 wherein the carrier further comprises a first build device operable to engage a workpiece, the lift device operable to selectively raise and lower the workpiece between an upper position and a lower position along the Z axis.

4. The transport system of claim 3 further comprising:
a second build device positioned along the path of travel at the workstation, the second build device comprising:
a second build device width and a second build device height which are each less than the transport device clearance opening allowing second build device to pass through the transfer device clearance opening on passage of the transport device through the workstation.

5. The transport system of claim 4 wherein the first build device comprises a first build fixture and the second build device comprises a second build fixture.

6. The transport system of claim 5 wherein the second build fixture is operable to engage and support the workpiece first engaged with the first build fixture, the second build fixture defining a clearance operable to allow the first build device to move from a first position and vertically pass through a portion of the second build device along the Z axis to a second position thereby disengaging the workpiece from the first build fixture for engagement of the workpiece to the second build fixture, wherein on raising of the lift device along the Z axis, the first build fixture re-engages the workpiece thereby disengaging the workpiece from the second build fixture.

7. The transport system of claim 6 wherein the second build device further comprises:
a platform positioned in the workstation, the platform operable to support the second build fixture.

8. The transport of system of claim 7 further comprising:
an AGV selectively engageable with the platform to selectively position the second build fixture in the workstation to receive the workpiece and to selectively remove the second build fixture from the workstation.

9. The transport system of claim 6 further comprising:
a platform selectively positioned in the workstation adjacent the path of travel;
an AGV selectively engaged with the platform operable to move and position the platform in the workstation adjacent the path of travel; and
a programmable robot connected to the platform, the robot operable to conduct a predetermined process on the workpiece positioned in one of the first build fixture or the second build fixture.

10. The transport system of claim 6 wherein the second build device comprises a second build fixture tool A and a second build fixture tool B; the second build device further comprising:
an AGV selectively engageable with second build fixture tool A and second build fixture tool B to alternatively position either second build fixture tool A or second build fixture tool B in the workstation for receipt of the workpiece.

11. The transport system of claim 5 wherein the first build fixture further comprises:
an elongate base connected to the mounting plate:
at least two holding arms rigidly connected to the elongate base;
a part support connected to each of the at least two holding arms, each part support operable to engage the workpiece.

12. The transport system of claim 3 wherein the carrier further comprises an elongate support device connected to the mounting plate, the first build device operable to removably engage the elongate support device.

13. The transport system of claim 3 wherein the carrier further comprises a support platform defining a plurality of precision located mounting holes; and
a plurality of holding fixture members connected to the support platform through the mounting holes, the plurality of holding fixture members operable to engage one or more workpieces.

14. The transport system of claim 1 wherein the manipulator device further comprises:
a support frame positioned in the clearance opening;
a mounting plate rotatably connected to the support frame and removably engaged with the carrier, the mounting plate selectively rotatable about a rotational axis relative to the support frame;
a motor supported by the frame in communication with the support frame and the control system, the motor operable to selectively rotate the mounting plate relative to support frame.

15. The transport system of claim 14 wherein the manipulator device further comprises a lift device, the lift device comprising:
a guide track connected to each frame side wall extending along the Z axis, the support frame engaged with each guide track;
a motor supported by the frame in communication with the support frame and the control system, the motor operable to selectively move the support frame and mounting plate along the Z axis relative to the frame.

16. The transport system of claim 1 wherein the sensor and control system are operable for the transport device to move and navigate autonomously along the path of travel.

17. The transport system of claim 1 wherein the carrier is operable to support the first build device, the transport system further comprising:
a second build device positioned along the path of travel at the workstation, the second build device having a width and a height which are each less than the transport device clearance opening allowing the second build device to pass through the transfer device clearance opening on passage of the transport device through the workstation.

18. The transport system of claim 17 wherein the second build device further comprises a platform, the transport system further comprises:
an AGV selectively engageable with the platform to selectively position the second build device in the workstation to receive the workpiece and to selectively remove the second build device from the workstation.

19. The transport system of claim 1 further comprising:
a platform positioned in the workstation adjacent the path of travel; and
process equipment connected to the platform, the process equipment operable to conduct a predetermined process on the workpiece positioned in the workstation.

20. The transport system of claim 19 wherein the process equipment comprises a programmable robot.

21. The transport system of claim 19 further comprising:
an AGV selectively engaged with the platform operable to selectively move and position the platform in the workstation adjacent the path of travel.

22. The transport system of claim 1 wherein the carrier further comprises an elongate support device connected to the manipulator, the first build device selectively connected to the elongate support device and operable to support the workpiece.

23. A method for transporting and positioning a workpiece at a workstation, the method comprises:
- moving a transport device having a frame and a first build device supporting a workpiece along a path of travel in communication with a workstation;
- passing a second build device positioned in the workstation along the path of travel through a clearance opening in the transport device frame;
- stopping the transfer device at a predetermined position at a workstation;
- moving the first build device along a Z axis from a first position to a second position relative to the frame and the second build device;
- disengaging the workpiece from the first build device; and
- engaging the workpiece to the second build device through movement of the first build device to position the workpiece at a desired location relative to the workstation for processing of the workpiece.

24. The method of claim 23 further comprising the steps of:
- moving the first build device along the Z axis from the second position back to the first position relative to the second build device;
- disengaging the workpiece from the second build device; and
- re-engaging the workpiece with the first build device following a predetermined process on the workpiece in the second build device.

25. The method of claim 23 wherein the second build device includes a second build fixture tool A and a second build fixture tool B, the method further comprising the steps of:
- selectively and alternatingly moving and positioning a second build fixture tool A and a second build fixture tool B in the workstation, wherein the workpiece engages the build fixture tool A or tool B positioned in the workstation.

* * * * *